(12) United States Patent
Welter et al.

(10) Patent No.: US 6,633,912 B1
(45) Date of Patent: Oct. 14, 2003

(54) SYSTEM, METHOD AND APPARATUS FOR PROVIDING AN ENTERPRISE PORTAL

(75) Inventors: Peter J. Welter, Erie, CO (US); John R. Meier, Longmont, CO (US); Dennis Gardner, Louisville, CO (US)

(73) Assignee: Freshwater Software, Inc., Boulder, CO (US)

( * ) Notice: Subject to any disclaimer, the term of this patent is extended or adjusted under 35 U.S.C. 154(b) by 226 days.

(21) Appl. No.: 09/906,946

(22) Filed: Jul. 13, 2001

Related U.S. Application Data

(63) Continuation-in-part of application No. 09/651,833, filed on Aug. 30, 2000, which is a continuation of application No. 09/170,130, filed on Oct. 12, 1998, now Pat. No. 6,138,157.
(60) Provisional application No. 60/221,832, filed on Jul. 28, 2000.

(51) Int. Cl.[7] .............................................. G06F 13/00
(52) U.S. Cl. ....................................................... 709/224
(58) Field of Search ................................ 709/200, 203, 709/224

(56) References Cited

U.S. PATENT DOCUMENTS

| 5,870,559 A | 2/1999 | Leshem et al. |
| 5,974,572 A | 10/1999 | Weinberg et al. |
| 6,003,143 A | 12/1999 | Kim et al. |
| 6,012,087 A | 1/2000 | Freivald et al. |
| 6,138,157 A | 10/2000 | Welter et al. |

*Primary Examiner*—Robert B. Harrell
(74) *Attorney, Agent, or Firm*—Perkins Coie LLP

(57) ABSTRACT

A method for providing an enterprise portal system includes providing test computers where each test computer is coupled to a database, providing servers where each said server supports at least one web site, and providing a portal coupled to the test computers and to a portal database. The test computers are coupled to at least one server, and operable to transmit and receive information from the at least one server. The portal is operable to transmit to and receive information from the test computers. The portal has an interface, preferably a browser, to allow the user to receive and input data. The user interface is tailored to the user, either by identifying the user individually, or by association with the user, such as a group or security level, or some other form of classification. This tailoring may be preformed before the first test is preformed, or may be incorporated into the first or latter tests for subsequent use. Preferably, the test computer is capable of direct HTTP and HTML communication with the servers. The portal is operable to transmit monitor configuration information to the test computers, wherein the test computers then transmit the monitor configuration information to the servers. This allows the functionality of the servers to be controlled by a user through the portal. The portal may also provide the user with the status of a server and a report of server functionality over a period of time.

29 Claims, 38 Drawing Sheets

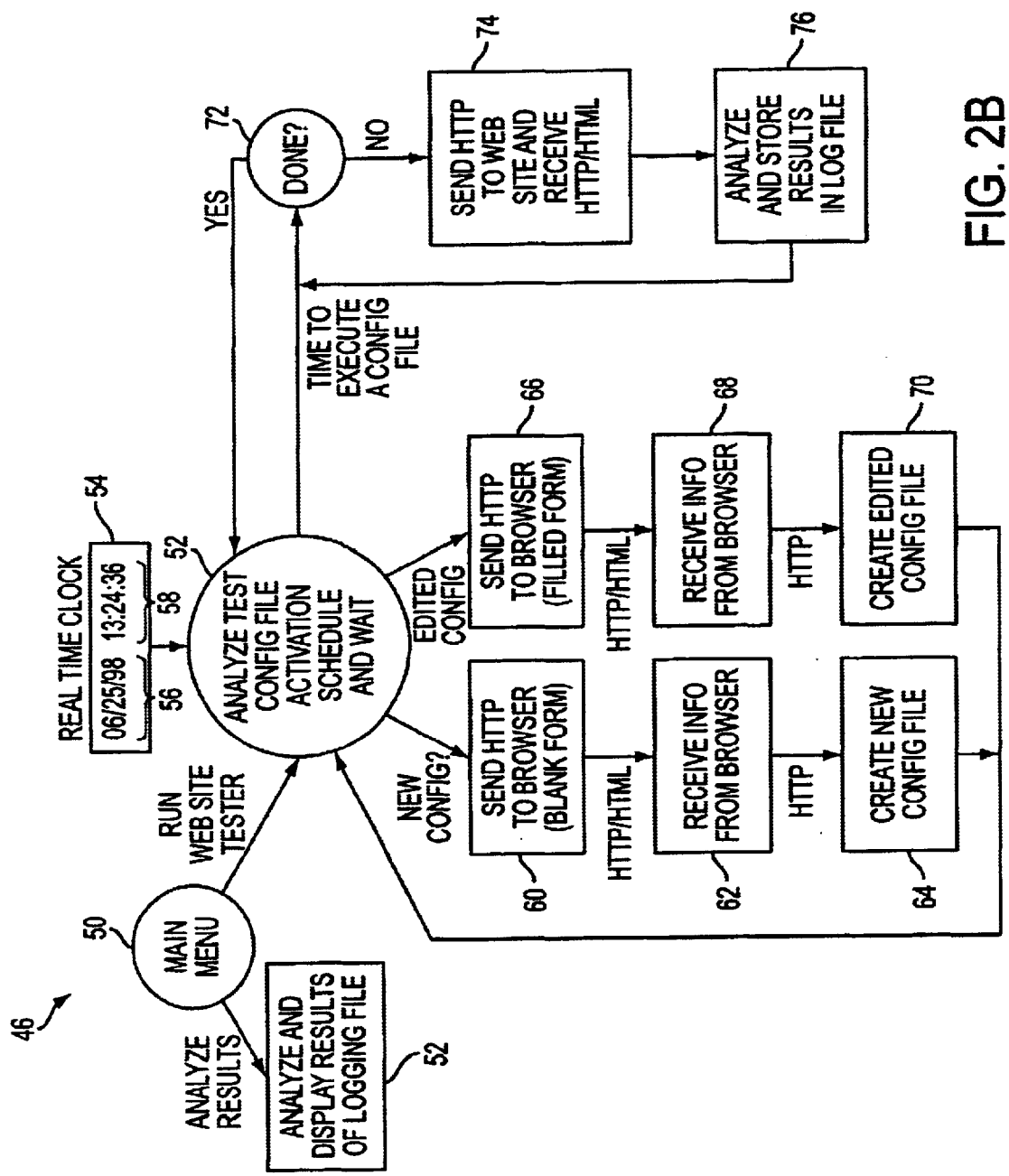

f r e s h w a t e r   s o f t w a r e (download | order | products | support | search | about us)

Is your business-critical web site up right now?

How do you know?

If you had SiteScope and SiteSeer, not only would you know if your web site was up, you would be confident that you would be notified immediately if a problem did occur. SiteScope allows you to monitor everything from memory and disk space usage to URL and service availability. Error notification is available via e-mail, pager, and SNMP traps. SiteScope can also run recovery scripts to correct common problems. The SiteSeer service monitors your site remotely, letting you know of problems your visitors are experiencing, but you're unaware of. Together, SiteScope and SiteSeer help ensure that your site is up and running smoothly 24 hours a day, 7 days a week.

SiteScope Software

Version 3.0 Available Now!
- 24 hour monitoring of web pages, forms, servers, and more...
- Immediate error notification via e-mail, pager, or SNMP trap
- Escalation of notification
- Automatic error recovery
- Ability to integrate with enterprise solutions Review SiteScope 3.0's release notes!

[try it] [buy it] [more info]

SiteSeer Service

E-commerce Transaction Testing Available!
- Remote web site monitoring 24 hours a day
- Support for secure URLs
- Verification of password protected pages
- String matching on both page content and error messages

[try it] [buy it] [more info]

Fresh News...

▶ PCToday raves about SiteScope in the work place in its February issue. Full Story ▶ DIGEX chooses SiteScope to monitor the world's largest dedicated server web site management facilities. Full Story ▶ SiteScope receives a Five Palm Tree rating from Beverly Hills Software. Full Story "They've found an important niche from a web server administrator perspective... It's expandable and customizable; it's a fantastic product."
— Brad Hogan, Newbridge Networks. More customer quotes

HOME | ORDER | PRODUCTS | SUPPORT | SEARCH | ABOUT US visit us at www.freshtech.com
Freshwater
Software™

Contact Us

© Copyright 1998 by Freshwater Software, Inc., Boulder, Colorado. All rights reserved.

FIG. 3A f r e s h w a t e r  s o f t w a r e

| home | order | products | support | search | about us |

Search Us

To search the documents on the Freshwater Software™ Web site, enter the words you want to search for below.

Search For [John_____] ←—86

[Find Documents] —88

By default, only documents containing all the words are found. To find documents containing any of the words, separate them with "OR". For example, 'mail OR support' to find any documents containing either of these words.

Site Contents

Order
- Ordering Options
- Online Order Form
- Product Pricing
- Fax or E-mail Order Form

84

Products
- SiteScope
  - Product Overview
  - Technical Specifications
  - List of Monitors
  - Download Page
  - Order Form
  - Pricing Information
  - Live Demo
  - Product Support Options
  - SiteScope FAQ
  - SiteScope Logos
  - License Agreement
- SiteSeer
  - Product

Support
- Online Documentation
- Software FAQ
- E-mail Support

About Us
- Corporate Fact Sheet
- Management Bios
- Employee List
- Contact Info
- Directions to our Office
- Press Releases
- Freshwater in the Press
- SiteScope Data Sheet
- Customer Quotes
- SiteScope Screen Shots
- SiteSeer Data Sheet
- Management Biographies

FIG. 3B f r e s h w a t e r  s o f t w a r e ( home | order | products | support | search | about us )

Search Results

Searching for: John

- *Who We Are (Thu 5 Feb 98)*
  "john" 5 (John)
- *SiteScopeFAQ (Wed 3 Jun 98)*
  "john" 4 (John)
- *Freshwater Software Contact Information (Thu 5 Feb 98)*
  "john" 3 (John)
- *Chief Technical Officer (Tue 26 May 98)*
  "john" 2 (John)
- *Escalation Rules (Fri 9 Jan 98)*
  "john" 2 (John)
- *DIGEX Selects Freshwater Software s SiteScope to Enhance Reliability for its Web Site Management Customers (Thu 5 Feb 98)*
  "john" 1 (John)
- *MANAGEMENT BIOGRAPHIES (Thu 5 Feb 98)*
  "john" 1 (John)
- *Freshwater Software™ Press Release (Fri 30 May 97)*
  "john" 1 (John)
- *THE FRESHWATER SOFTWARE PRESS ROOM (Thu 5 Feb 98)*
  "john" 1 (John)
- *Freshwater Software™ Press Release (Thu 5 Feb 98)*
  "john" 1 (John)

HOME | ORDER | PRODUCTS | SUPPORT | SEARCH | ABOUT US visit us at www.freshtech.com
Freshwater Software

90

Contact Us

© Copyright 1998 by Freshwater Software, Inc., Boulder, Colorado. All rights reserved.

This searchable archive was implemented with the ICE search engine

☐ Disable — 124
temporarily disable monitor sampling and alerting

Step 1 POST Data:
```
Name = ABC
Address = DEF
```
126
optional name=value variables, one per line, to send with a POST request for this step Step 1 Match Content: `Thank you for entering your name` — 128
optional text to match against content of the URL for this step Step 1 Error If Match: `Invalid entry` — 130
optionally generate an error if the content of the URL for this step contains this text Step 1 Authorization User Name: `PAUL` — 132
optional user name if the URL for this step requires authorization Step 1 Password: `SECRET` — 134
optional password if the URL for this step requires authorization Step 2 POST Data:
optional name=value variables, one per line, to send with a POST request for this step Step 2 Match Content:
optional text to match against content of the URL for this step Step 2 Error If Match:
optionally generate an error if the content of the URL for this step contains this text Step 2 Authorization User Name:
optional user name if the URL for this step requires authorization Step 2 Password:
optional password if the URL for this step requires authorization Step 3 POST Data:
optional name=value variables, one per line, to send with a POST request for this step Step 3 Match Content:
optional text to match against content of the URL for this step Step 3 Error If Match:
optionally generate an error if the content of the URL for this step contains this text Step 3 Authorization User Name:
optional user name if the URL for this step requires authorization

FIG. 4B

| Field | Value | Description |
|---|---|---|
| Step 3 Password | | optional password if the URL for this step requires authorization |
| Step 4 POST Data | | optional name=value variables, one per line, to send with a POST request for this step |
| Step 4 Match Content | | optional text to match against content of the URL for this step |
| Step 4 Error If Match | | optionally generate an error if the content of the URL for this step contains this text |
| Step 4 Authorization User Name | | optional user name if the URL for this step requires authorization |
| Step 4 Password | | optional password if the URL for this step requires authorization |

Verify Error
if the monitor detects an error, immediately perform the check again to verify the error.

138 —
Update every (on errors) [60] [minutes ▼] ／136
the amount of time between checks whenever the status of the monitor is not ok, the Update value from above is used if this is left blank Schedule [every day, all day ▼] ／140
schedule for the monitor to be enabled - for example, disable Sunday from 10:00 to 14:00, if blank monitor is always enabled 142 — Edit Schedules Monitor Description [　　　　　　　　　] ／144
additional description of monitor that appears on Monitor Detail page (optional)

Report Description [　　　　　　　　　] ／146
additional description of monitor that appears on Reports and in monitor popup info (optional)

Timeout [60] ／148
the time out, in seconds, to wait for entire sequence to complete HTTP Proxy [　　　　　　　　　150A] ⎫
optional proxy server to use including port (example: proxy.freshtech.com:8080) ⎬ 150
Proxy Server User Name [　　　　　　　　150B] ⎬
optional user name if the proxy server requires authorization ⎬
Proxy Server Password [　　　　　　　　150C] ⎭
optional password if the proxy server requires authorization List Order [last ▼] ／152
choose where this monitor appears in the list of monitors on the Monitor Detail page ／154
Error if [status != 200 (default) ▼] [!= ▼] [　　]

96

122 Warning if [status == -994 (default) ▼] [== ▼] [　　]

[Add] Monitor    156

FIG. 4C

```
                                                     example.mg
              _id=1
              _class=URLSequenceMonitor
              _name=URL Transaction: http://www.freshtech.com
              _description=
 174          _monitorDescription=Example transaction of 5 steps
              _frequency=600
              _timeout=60
              _errorFrequency=120
              _disabled=false
              _verifyError=false
              _proxy=
              _proxyusername=
              _proxypassword=                           172
              _schedule=
            ⎧ _referenceType1=url
            ⎪ _reference1=http://www.freshtech.com
            ⎪ _errorContent1=Not Found
       176 ⎨  _username1=
            ⎪ _password1=
            ⎩ _content1=
            ⎧ _referenceType2=link
            ⎪ _reference2=SEARCH
            ⎪ _errorContent2=
       178 ⎨  _username2=
            ⎪ _password2=
            ⎩ _content2=
            ⎧ _referenceType3=form
            ⎪ _reference3=Find Documents
            ⎪ _postData3=KEYWORDS=John
       180 ⎨  _content3=Officer
            ⎪ _errorContent3=
            ⎪ _username3=
            ⎩ _password3=
            ⎧ _referenceType4=url
            ⎪ _reference4=http://www.macromedia.com/index.html
            ⎪ _errorContent4=
       182 ⎨  _username4=
            ⎪ _password4=
            ⎩ _content4=
            ⎧ _referenceType5=frame
            ⎪ _reference5=mm_nav
            ⎪ _errorContent5=
       184 ⎨  _username5=
            ⎪ _password5=
            ⎩ _content5=
```

FIG. 6

| SiteScope | Alerts | Reports | Help |

Add URL Transaction Monitor

Step 1 url http://www.freshtech.com    350 ok, 0.19 sec

Step 2 Select which option to use for the next step in the transaction

⦿ PRODUCTS ▼ — 352
This is a list of available links on this page

○ {/index-cgi/ice-form.pl}Search ▼ — 354
This is a list of available Submit buttons on this page, the format is {FormName} ButtonName

```
{/index-cgi/ice-form.pl}KEYWORDS=
{/index-cgi/ice-form.pl}DAYS=
{/index-cgi/ice-form.pl}THESAURUS=
{/index-cgi/ice-form.pl}SUBSTRING=substring
```
— 356

This is a list of available input items on this page, the format is {FormName} InputName ○ http://
Example: http://demo.freshtech.com 358 — [Back 1 Step]  [Add Step] 360  [Add Monitor] — 362

Choose Back to go back to the previous step in the transaction
Choose Add Step to add this step and go on to the next step in the transaction
Choose Add Monitor when you have added all the steps for this URL Transaction monitor Update Every 10 minutes ▼
Title [         ]

Advanced Settings

FIG. 10B

Add URL Transaction Monitor

370

Step 1  url http://www.freshtech.com

Step 2  link PRODUCTS ok, 0.80 sec

Step 3  Select which option to use for the next step in the transaction

○ [<B>SiteScope™</b> ▼] ─352
    This is a list of available links on this page ◉ [{/index-cgi/ice-form.pl}Search ▼] ─354
    This is a list of available Submit buttons on this page, the format is {FormName} ButtonName

```
    {/index-cgi/ice-form.pl}KEYWORDS=John
    {/index-cgi/ice-form.pl}DAYS=
    {/index-cgi/ice-form.pl}THESAURUS=
    {/index-cgi/ice-form.pl}SUBSTRING=substring
    ```
    ─356

This is a list of available input items on this page, the format is {FormName} InputName ○ [http://]
    Example: http://demo.freshtech.com 358─[ Back 1 Step ]   360─[ Add Step ]   362─[ Add Monitor ]

Choose Back to go back to the previous step in the transaction
  Choose Add Step to add this step and go on to the next step in the transaction
  Choose Add Monitor when you have added all the steps for this URL Transaction monitor Update Every [10] [minutes ▼]
Title [                    ]

Advanced Settings

FIG. 10C

Add URL Transaction Monitor

Step 1 url http://www.freshtech.com

Step 2 link PRODUCTS

Step 3 form Search

KEYWORDS=John
    ok, 1.18 sec

Step 4   Select which option to use for the next step in the transaction

○ <I>The Freshwater Software Team </I>  — 352

This is a list of available links on this page

⊙ http://www.macromedia.com/index.html — 357

Example: http://demo.freshtech.com

[ Back 1 Step ]  [ Add Step ]  [ Add Monitor ]
  358          360         362

Choose Back to go back to the previous step in the transaction

Choose Add Step to add this step and go on to the next step in the transaction Choose Add Monitor when you have added all the steps for this URL Transaction monitor Update Every [10] [minutes ▼]

Title [_____]

Advanced Settings

☐ Disable temporarily disable monitor sampling and alerting

FIG. 10D

Add URL Transaction Monitor

Step 1 url http://www.freshtech.com

Step 2 link PRODUCTS

Step 3 form Search
       KEYWORDS=John

Step 4 url http://www.macromedia.com/index.html
       ok, 1.54 sec

Step 5 Select which option to use for the next step in the transaction

○ [Microsoft Internet Explorer ▼] — 352
This is a list of available links on this page ◉ [contents ▼] — 364
This is a list of available frames on this page ○ [http:// ] — 357
Example: http://demo.freshtech.com 358 — [Back 1 Step]  [Add Step] — 360  [Add Monitor] — 362

Choose Back to go back to the previous step in the transaction
Choose Add Step to add this step and go on to the next step in the transaction
Choose Add Monitor when you have added all the steps for this URL Transaction monitor Update Every [10] [minutes ▼]
Title [ ]

Advanced Settings

FIG. 10E

Add URL Transaction Monitor

Step 1 url  http://www.freshtech.com

Step 2 link  PRODUCTS

Step 3 form  Search
              KEYWORDS=John

Step 4 url  http://www.macromedia.com/index.html

Step 5 frame  contents
              ok, 2.51 sec

Step 6  Select which option to use for the next step in the transaction  — 352

○ `<img src="/images/index_gif_images/products.gif" width="100" height="24" border` ▼
This is a list of available links on this page ◉ `http://`  — 357
Example: http://demo.freshtech.com 358 — [ Back 1 Step ]   [ Add Step ] — 360   ( Add Monitor ) — 362

Choose Back to go back to the previous step in the transaction
Choose Add Step to add this step and go on to the next step in the transaction
Choose Add Monitor when you have added all the steps for this URL Transaction monitor

---

Update Every [10]  [minutes ▼]
Title [                    ]

Advanced Settings

FIG. 10F

Add Composite Monitor

Items (752, 754):
- test
- test: Transaction: Place order using ordering web site
- test: Database: Confirm in orders database
- test: Transaction: look for order in account web site
- test: Script: check order in legacy system
- test: Mail: Receive Confirmation Email
- test: Transaction: check shipping detail on UPS web site select one or more groups and/or monitors that will be checked

Update every [10] [minutes ▼] — 756
amount of time between checks of a monitor

Title [        ]
title that should appear in the Monitor table (optional)

[Add] Monitor

---

Advanced Options

☐ Disable
temporarily disable monitor sampling and alerting

☑ Run Monitors
Run each monitor before checking.

☐ Single Session
Run all monitors in a single session - if this box is checked then URL monitors use the same set of cookies and the same connection to the server.

Monitor Delay [0]
If running each monitor, delay in seconds between monitors ☐ Check All Monitors in Group(s)
By default, a group is counted as a single item when checking status. If this box is checked, all of the monitors in selected groups (and their subgroups) are checked and counted towards the totals.

☐ Verify Error
if the monitor detects an error, immediately perform the check again to verify the error.

FIG. 16A

SYSTEM, METHOD AND APPARATUS FOR PROVIDING AN ENTERPRISE PORTAL

CROSS REFERENCE

The present invention claims the benefit of U.S. Patent Provisional Application No. 60/221,832, filed Jul. 28, 2000, as well as being a continuation-in-part of U.S. patent application Ser. No. 09/651,833 filed Aug. 30, 2000, which itself is a continuation of U.S. patent application No. 09/170,130, filed Oct. $12^{th}$, 1998, which has matured into U.S. Pat. No. 6,138,157. Also, this application is cross referenced to co-pending applications METHOD AND SYSTEM FOR CREATING DYNAMIC WEB TRANSACTION TESTS, A BUSINESS METHOD FOR PROVIDING A MONITORING SYSTEM and APPARATUS AND METHOD FOR MONITORING A CHAIN OF ELECTRONIC TRANSACTIONS, all of which have been filed contemporaneously. All cross referenced applications and patents are incorporated herein by reference.

BACKGROUND OF THE INVENTION

This invention relates generally to wide area networks, and more particularly to systems and methods for creating test to evaluate web sites hosted by web servers coupled to a TCP/IP protocol network.

The Internet is a robust, Wide Area Network (WAN) of networks which permits communication among computers, networks, and other digital devices which adhere to a standard "TCP/IP" protocol. One of the most popular ways of communicating over the Internet is through the World Wide Web (WWW) comprising innumerable "web sites", which are hosted on suitable digital processing machines such as personal computers, workstation, servers, etc. Users or "clients" use, for example, their personal computers to communicate with a web site via a browser program or, simply, "browser." Currently, the most commonly used browser is the Internet Explorer™ from Microsoft, Inc.

It has become increasingly easy for companies and individuals to create their own web sites. There are a number of commercially available software applications which generate the necessary HTML code to create "web pages" which can be uploaded to web servers connected to the Internet. There are also web sites that can be used to create content for other web sites. Connections to the Internet and web server hosts are often provided by a company known as an Internet Service Provider (ISP).

Since web pages are, essentially, programs written in the HTML language, it is possible that one or more web pages of a web site may contain errors. These errors may only show up intermittently since much of the interaction with the web site can be dynamic, i.e. the interaction can change from session to session. Therefore, a need has arisen for some method to test web sites for errors.

In FIG. 1, a system 10 for testing a web site includes a TCP/IP protocol network, such as the Internet 12, a web server 14 coupled to the Internet 12 by an ISP 16, any number of user or client machines such as client machines 18A, 18B, 18C, etc. coupled to the Internet 12 by ISP's 20A, 20B, 20C, etc., and a testing computer 22 coupled to the Internet 12 by an ISP 24.

In the prior art, software running on the testing computer 22 connects with a web site 26 hosted by the web server 14 through the Internet 12 and attempts to download web pages. Upon a failure to download a web page, the testing computer 22 running this prior art software detects an error.

It should be noted that the depiction of FIG. 1 is logical in nature, and may be implemented in a variety of fashions. For example, the testing computer 22 and the web server 14 can be the same machine. As another example, any of the client machines 18A, 18B, 18C, etc., or the testing computer 22, or the web server 14 can be connected into the Internet 12 in other fashions, such as into the "backbone" of the Internet. Further the Internet 12 is only one example of a network implementing a TCP/IP protocol. Other examples of TCP/IP protocol networks include Intranets and Extranets, as will be appreciated by those skilled in the art.

The testing computers 22 of the prior art include testing software which simulate browser software to the extent that they can download web pages. The successful downloading of a web page in the prior art was usually considered sufficient to determine that the web page was error free. In some instances, prior art testing computers 22 may examine or "parse" the HTML of the downloaded web page to make further determination whether there is an error in the downloaded web page. An example of prior art testing software includes the WhatsUp™ software of IpSwitch, Inc. of Lexington, Mass. This software is capable of testing only a single web page.

Unfortunately, the simple downloading of web pages with, perhaps, a cursory examination of the HTML is often insufficient to determine all the errors that a user might encounter when actually interacting with those web pages. This is due, in part, to the complex interactivity permitted under the HTML standards, and is due, in part, to the fact that many interactions with web pages are "dynamic" in that they may change from session to session. It would therefore be desirable to have a method for creating a test for a web site which can test multiple features of web pages, and which can handle dynamic interactions with the web site.

SUMMARY OF THE INVENTION

The present invention provides an enterprise portal system and method for testing a web site within a distributed computing system. The invention allows a user to utilize the power of a distributed network while presenting a distributed computer environment in a simplified single interface. The user interface is tailored to the user, either by identifying the user individually, or by association with the user, such as a group or security level, or some other form of classification. This tailoring may be preformed before the first test is preformed, or may be incorporated into the first or latter tests for subsequent use.

A system for testing a web site within a distributed computing system in accordance with the present invention includes a plurality of test computers, a plurality of servers, and a portal. Each test computer includes a processor and a memory and is coupled to a database. Each server is operable to support at least one web site, and each test computer is coupled to at least one server and operable to transmit and receive information from at least one server. The portal is coupled to the test computers and to a portal database. The portal is operable to transmit and receive information from the test computers, and has an interface that allows a user to receive and input data into the portal.

In a preferred embodiment, the test computer is capable of direct HTTP and HTML communication with the servers and the information communicated is test information that relates to the functionality of a web site. The portal is operable to transmit monitor configuration information to the test computers, wherein the test computers then transmit the monitor configuration information to the servers. This allows the functionality of the servers to be controlled by a user through the portal. The portal may also provide the user with the status of a server and a report of server functionality over a period of time.

A method for providing an enterprise portal system in accordance with the present invention provides a plurality of test computers, provides a plurality of servers that are operable to support at least one web site, and provides a portal coupled to the test computers and operable to transmit and receive information from said test computers. Each test computer is coupled to a database and at least one server and is operable to transmit and receive information from at least one said server. The portal has an interface that allows a user to receive and input data.

An advantage of the present invention is that the enterprise portal services is a single interface to the distributed computing system. The distributed computer network may be configured and tested while the distributed nature of the computer system is hidden from the user. The user may take full advantage of the benefits of a distributed computer system without the increased complexity that usually accompanies distributed computing environments These and other advantages of the present invention will become apparent to those skilled in the art upon a reading of the following descriptions of the invention and a study of the several figures of the drawing.

BRIEF DESCRIPTION OF THE DRAWINGS

The invention, together with further advantages thereof, may best be understood by reference to the following description taken in conjunction with the accompanying drawings in which:

FIG. 2B is a flow-diagram illustrating the overall operation of the present invention;

FIGS. 3A, 3B, 3C, 3D, and 3E illustrate a series of HTML web pages that will be used as an example when explaining the present invention;

FIGS. 4A, 4B, and 4C illustrate a blank form used to develop the testing configuration file of the present invention;

FIG. 6 is an exemplary test configuration developed by the process of the present invention from the web pages of FIGS. 3A–3E;

FIG. 10B is an illustration showing a step2 monitor editing page, in accordance with an embodiment of the present invention;

FIG. 10C is an illustration showing a step3 monitor editing page, in accordance with an embodiment of the present invention;

FIG. 10D is an illustration showing a step4 monitor editing page, in accordance with an embodiment of the present invention;

FIG. 10E is an illustration showing a step5 monitor editing page, in accordance with an embodiment of the present invention;

FIG. 10F is an illustration showing a step6 monitor editing page, in accordance with an embodiment of the present invention;

FIG. 16A is an illustration showing an business transaction chain monitor interface, in accordance with an embodiment of the present invention;

DETAILED DESCRIPTION OF THE PREFERRED EMBODIMENTS

Figure 1:
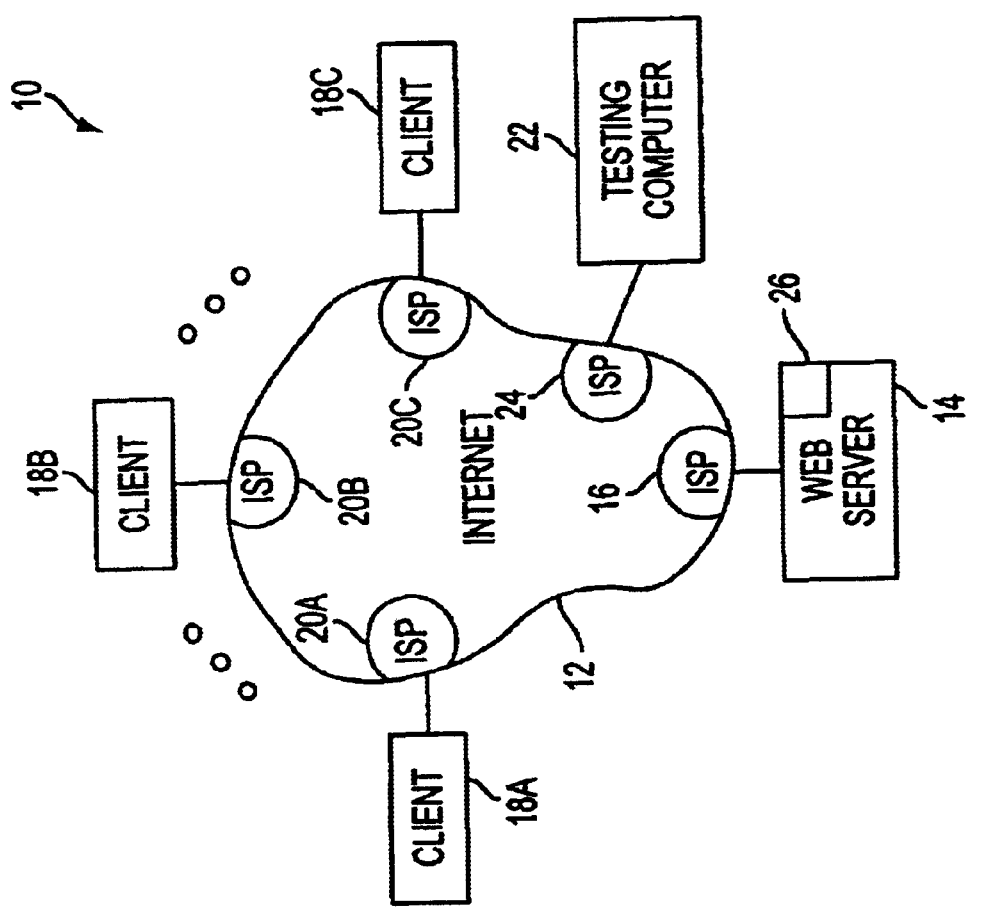
FIG. 1 is an illustration of a system including the Internet, a number of client machines, a web server, and a testing computer.
Figure 2:
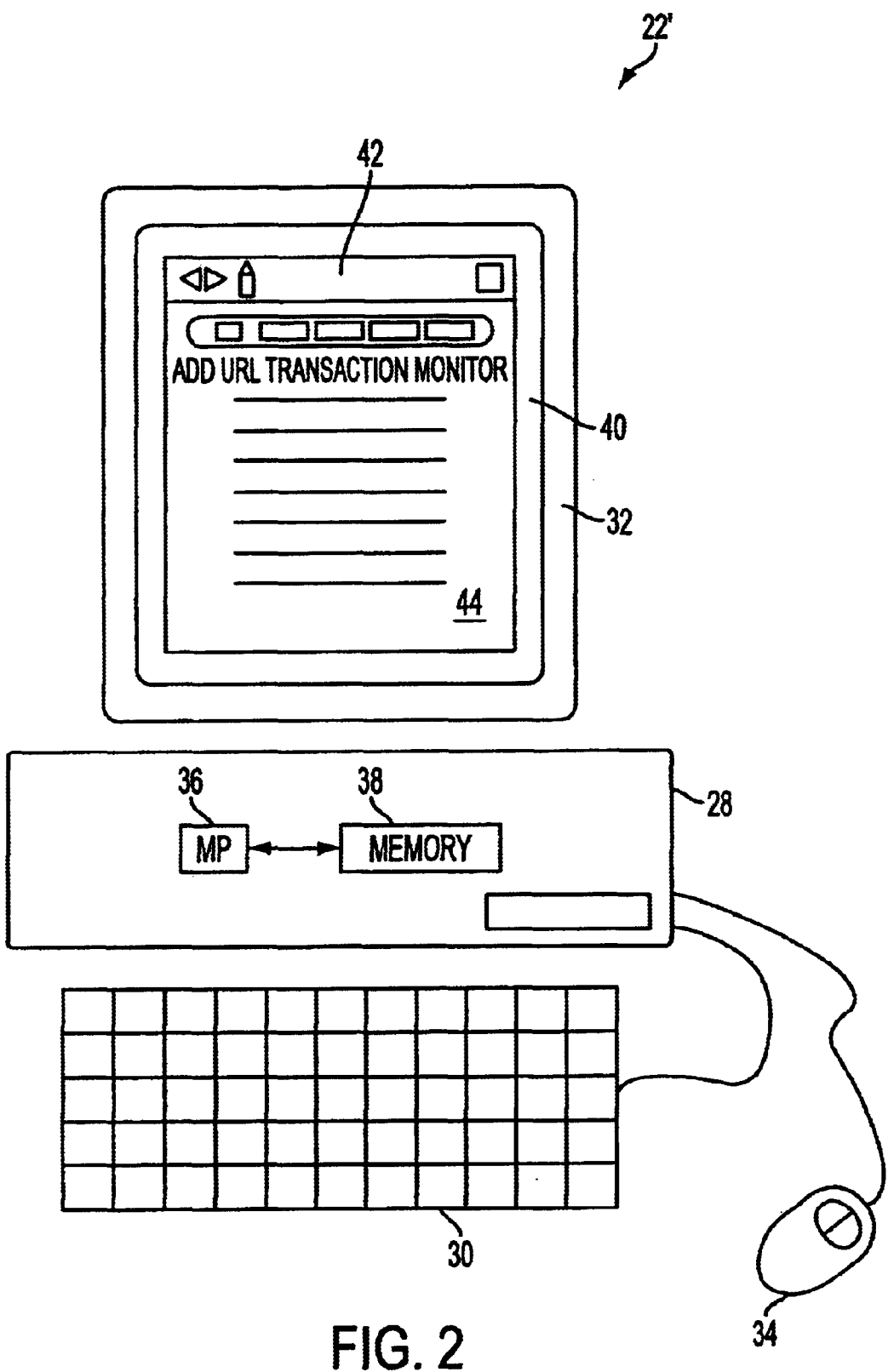
FIG. 2 is a pictorial representation of a testing computer 22' of the present invention.

FIG. 1 was described in terms of the prior art. In FIG. 2 a computer apparatus 22' implements a process for testing a web site in accordance with the present invention. More particularly, an apparatus 22' of the present invention includes a computer 28, a keyboard 30, a video monitor 32, and preferably a mouse 34 or some other form of pointing device. As will be appreciated by those skilled in the art, the computer 28 includes a microprocessor 36 and computer readable memory 38 which support computer implemented processes. Displayed on the screen 40 of the monitor 32 is a web browser window 42 displaying a web page 44 of the present invention. The computer 28 and the peripherals 30, 34, and 40 comprise standard personal computer and workstation equipment, available from a variety of sources.

Figure 2A:
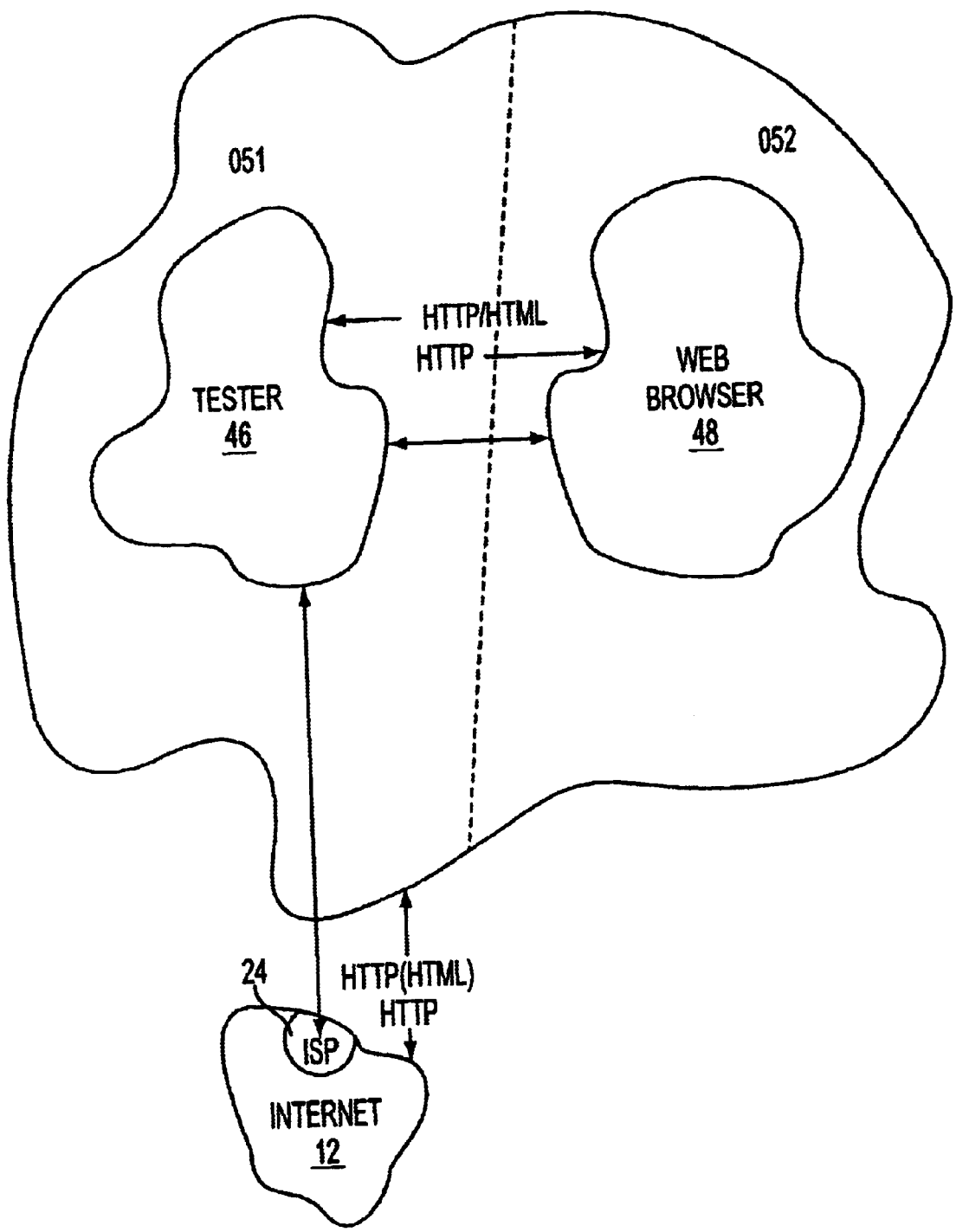
FIG. 2A is a pictorial representation of testing software implementing the present invention, as well as standard web browser software.

FIG. 2A illustrates the relationship of tester software 46 of the present invention to web browser software 48 and the Internet 12. More particularly, the tester software 46 communicates directly with the Internet 12 through ISP 24. Tester software 46 may pass and receive formatted information and messages including but not limited to HTML and HTTP. That is, the tester software 46 can pass HTTP information to the Internet 12 and receive HTTP request/ HTML document from the Internet 12 without the need for an intermediary of a web browser. The tester software 46 communicates independently with the web browser 48 by sending HTTP to the web browser 48 and by receiving HTTP/HTML from the web browser 48. Though the tester software 46 in the present invention is discussed in terms of sending and receiving HTML and HTTP information, the tester software 46 may send and receive other types of formatted information and messages for use in web sites as appreciated by those skilled in the art.

As suggested in FIG. 2A, the tester software 46 and the web browser 48 can be implemented on the same computer apparatus ("machine") or on separate computer apparatus. The case where the tester software 46 and the web browser 48 have been implemented on the same computer apparatus 22', they both can operate under the same operating system, i.e. OS1=OS2. However, in the instance where the tester software 46 and the web browser 48 are implemented on different computer apparatus, the tester software 46 and the web browser 48 can be supported on different operating systems, i.e. OS1 can be different from OS2. For example, the tester 48 may be implemented under a personal computer operating system such as under Windows 95, while the web browser 48 might be implemented on another computer under a workstation operating system such as UNIX.

In FIG. 2B, a flow-diagram illustrates various operations of the tester software 46. At a main menu 50, it is determined whether the user wants to run the web site tester or to analyze results of previous web site tests. If it is determined that the user wishes to analyze results, a "logging file" or "log file" is analyzed and results are displayed in an operation 52. Statistical methods for analyzing data, and tabular and graphical methods for displaying data are well known to those skilled in the art and will not be described here. If, on the other hand, it is determined from the main menu 50 that the web site tester is to be run, an operation 52 analyzes a test configuration file, as well as an activation schedule. The operation 52 has, as an input, a real-time clock 54 which can provide a real-time date 56 and real-time hours, minutes and seconds 58. Often, a real time clock 54 provides one long number that represents elapsed time from a given date and time, and which can then be algorithmically converted into date, hours, minutes and seconds.

If operation 52 detects that a new test configuration file is being requested via a web browser 48, a "blank form" comprising an HTTP/HTML document or message is sent to the browser. After the blank form has been filled in by a user of the browser, the process receives the information from the browser in an operation 62. This is returned in a form of a formatted message such as an HTTP message, as will be appreciated by those skilled in the art. Then, operation 64 is used to create a new test configuration file, and process control is returned to operation 52.

If, on the other hand, operation 52 determines that the user wishes to edit a test configuration file, a "Fig. Form" is sent in HTTP/HTML format to the browser in an operation 66. The edit information is received from the browser in operation 68 in the form of HTTP format. An operation 70 then creates the edited test configuration file, and process control is returned to operation 52.

When operation 52 determines that it is time to execute the configuration file by analyzing the activation schedule and by comparing the activation schedule to information received from the real-time clock 54, process control is turned over to operation 72 to determine whether the execution of the configuration file is completed. If so, process control returns to operation 52. If not, then operation 74 sends HTTP formatted information to the web site and receives, in turn, HTTP/HTML document or message from the web site that is being tested. The HTTP/HTML document or message is analyzed and the results are stored in a log file. In addition, the analysis of operation 76 determines the nature of the next HTTP transmission to the web site in operation 74. This analysis will be described in greater detail below.

In FIGS. 3A–3E, a number of exemplary web pages are presented to describe the process of the present invention. It should be noted this is just one example of a virtually unlimited number of web pages and web page combinations which can be tested by the process of the present invention.

In FIG. 3A an illustrated web page 78 is the "home page" of Freshwater Software, Inc. Among other features, it includes a series of buttons 80 which form "links" to other web pages. In particular, a button 82 makes a link to. a "search" web page.

In FIG. 3B, the search web page 84 that was accessed by the button 82 of the home web page 78 includes a number of features including a data entry field 86 and a submit button 88. As seen in this example, the data entry field 86 includes the string "John", such that instances of the word "John" on the Freshwater Software web site will be found after the submit button 88 is activated. As is well known to users of web browsers, buttons such as buttons 82 and 88 are activated with a pointer device such as the mouse 34, or by pressing the "ENTER" key on a keyboard 30.

FIG. 3C shows a results web page 90 listing all of the instances including the string "John" that is on the Freshwater site.

Figure 3D:
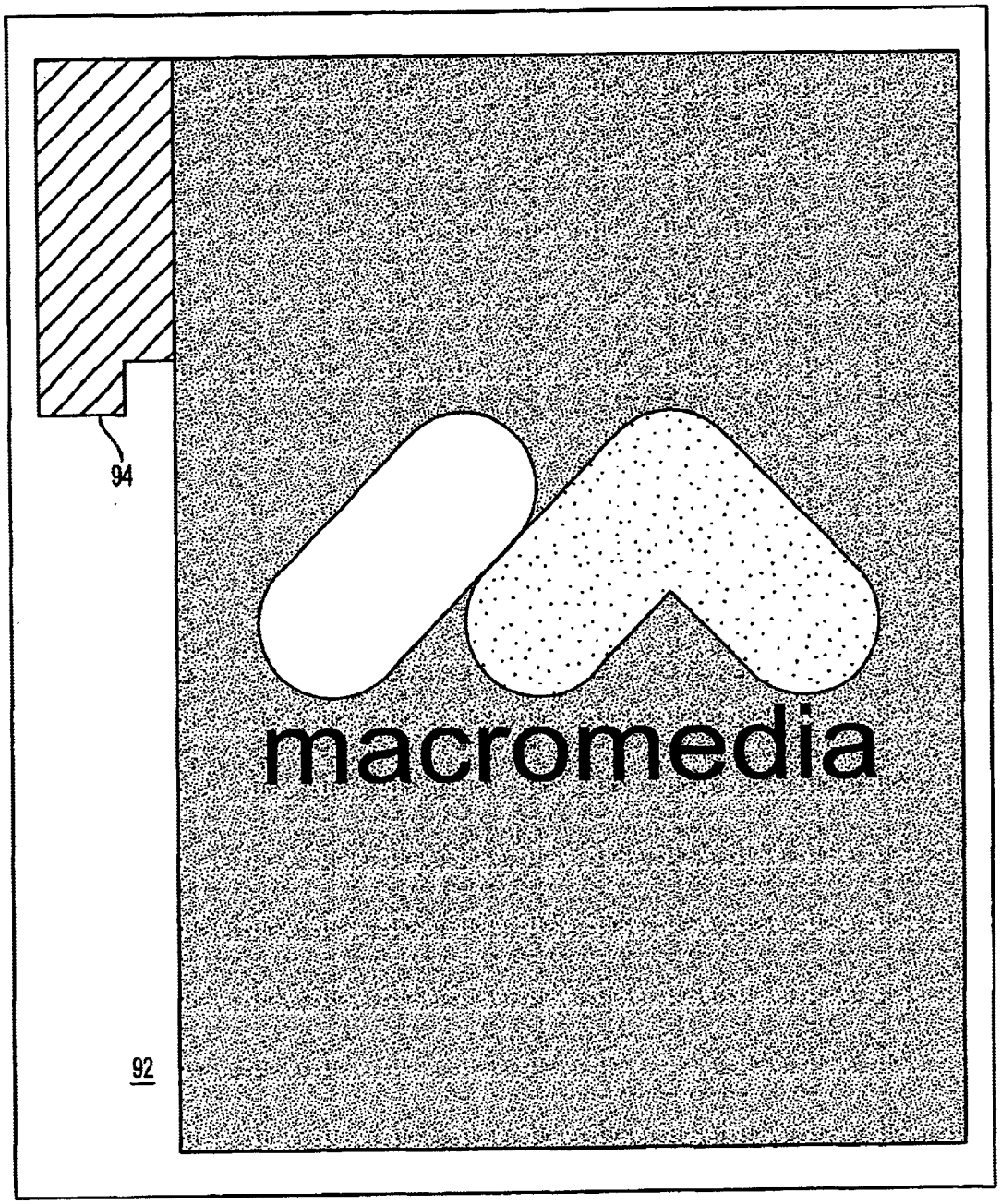
Figure 3E:
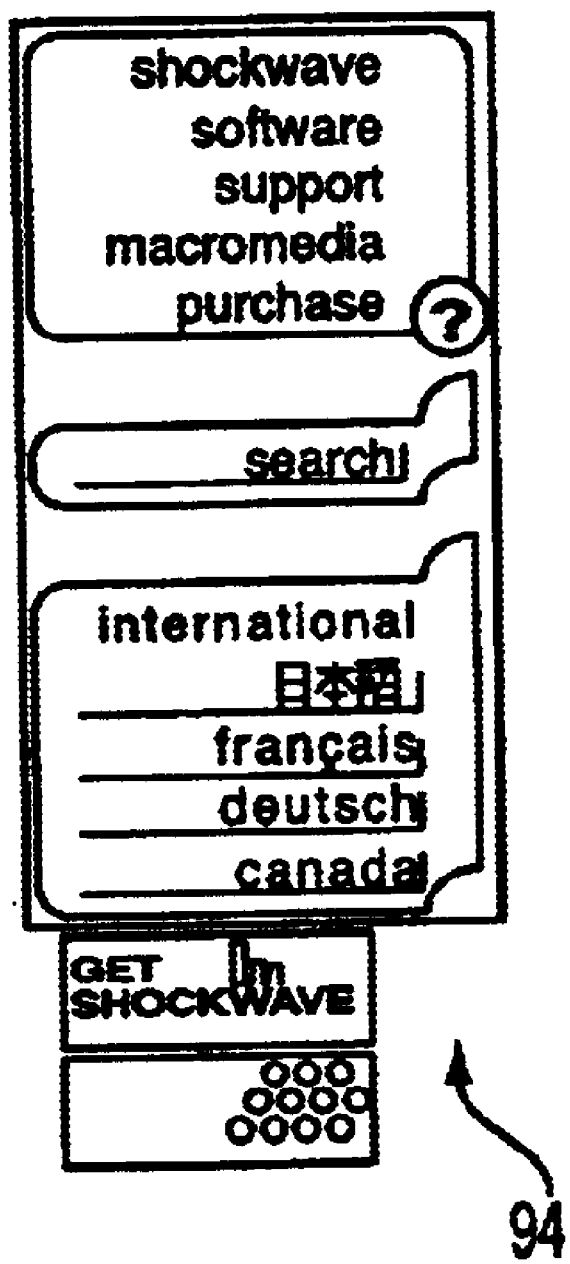

FIG. 3D illustrates a web page 92 for another company, Macromedia. A portion 94 of the web page 92 is a separate web page 94 as illustrated in FIG. 3E. This is an example of "framing" wherein a web page is embedded within another web page. Such "nesting" or "embedding" can occur to multiple levels, i.e. frames within frames within frames.

Figure 4A:
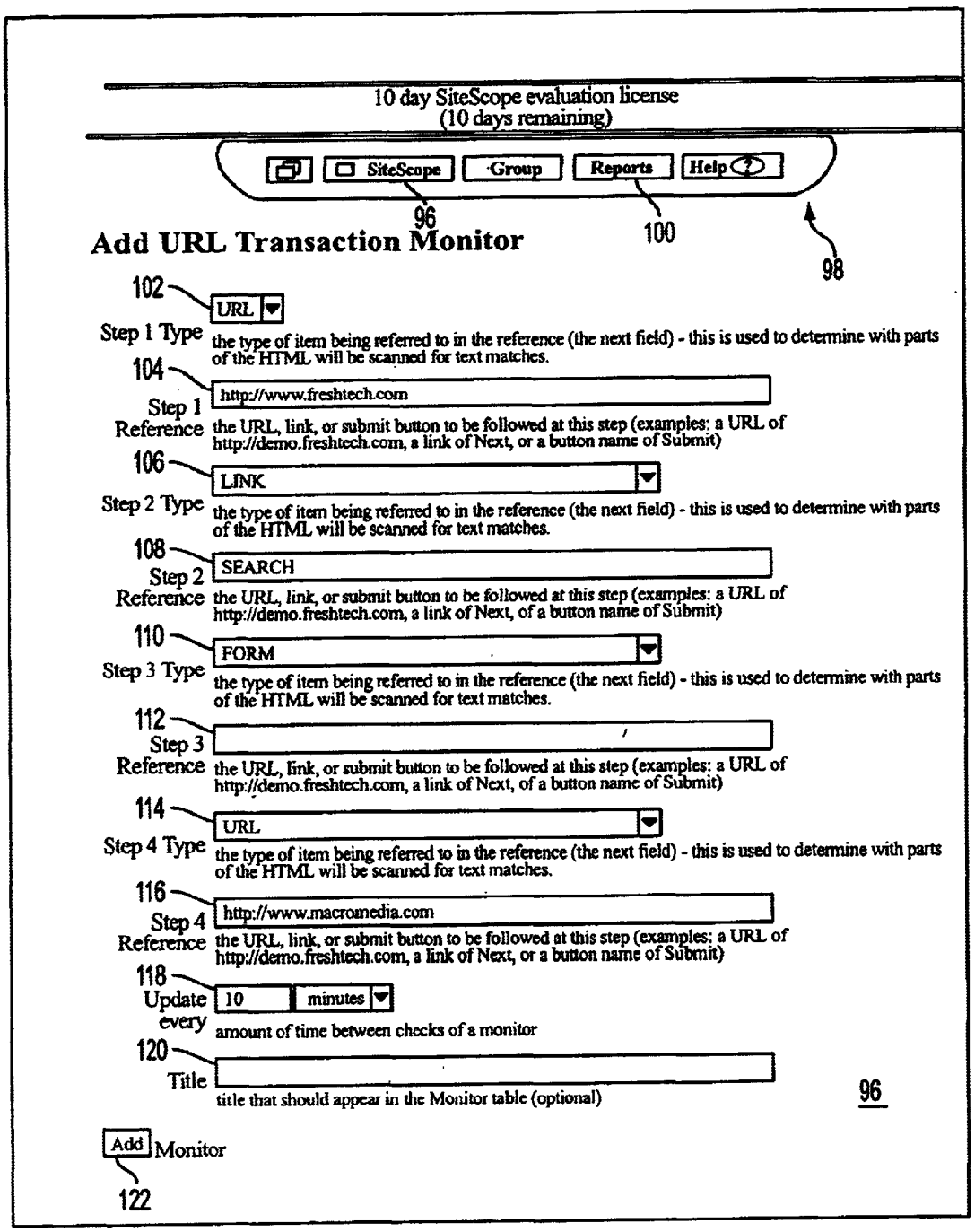

FIGS. 4A, 4B, 4C illustrate the web page 44 of FIG. 2 in greater detail. More particularly, these are the web pages used to create a "monitor object" which will be used to test and gather data concerning the operation of a web site under test. It should be noted that multiple monitors monitoring multiple web sites or monitoring a single web site in multiple fashions can be operating simultaneously. This is a well-known function of an object oriented programming and of a multi-tasking computer system. However, the following description will be in the context of creating a specific monitor object, which will test the functionality of the pages of FIGS. 3A–3E.

As noted in FIG. 4A, the "Add URL Transaction Monitor" refers to a number of steps. This particular web page 96 is created by activating the "SiteScope" button 96 of the button bar 98. Another button 100 labeled "Reports" can be used to generate test result reports. Therefore, it will be appreciated that the process 46 of FIG. 2B can utilize a web browser window 42 for user interface purposes.

Under step1 type, a pull down menu 102 is provided which has the entry of URL. This is because the step1 reference 104 must always be a URL to act as a starting point for the process. The URL can be the URL of a web site home page, or of any other web page. It is merely a starting point for the test. The step2 type pull down window 106 is a "link" to a button labeled "Search" as in a step2 reference 108. Step3 type is selected to be "Form" in pull down menu 110, while the entry field 112 of step3 reference is left blank. Step4 type in pull down window 114 is "URL", while the URL in field 116 is input as "http://www.macromedia.com." An update box 118 is set at every 10 minute. An optional title that would appear in the monitor table from the field 120 is left blank. A button 122 is activated if the monitor is to be created from this data.

In FIG. 4B, the web page 96 further includes a "disable" box 124 to temporarily disable the monitor sampling and alerting. Next, a step 1 POST data field 126 has, as entries, "name=abc" and "address=def". The data in the POST data field 126 is used to fill in field parameters. A step1 match content field 128 includes the string "Thank you for entering your name." A step1 "error if match" field 130 includes the string "invalid entry." A step1 authorization user name 132 includes a user name Paul, and step 1 password field 134 including a password "secret." Step2 POST data and step3 POST data can likewise be entered.

In FIG. 4C, the end of the step3 POST data and the step4 POST data can be seen on the remainder of page 96. Below the words "Verif Error" a different portion-of the web page 96 is presented which is generic to other parts of the software of the present invention. More particularly, pull down menu 136 permits the update period of minutes, hours, days, etc. to be selected while entry filed 138 indicates the number of seconds, minutes, hours, etc. The update indicates the amount of time between checks whenever the status of the monitor indicates a problem.

A pull down menu 140 indicates a schedule for the monitor to be enabled. In this instance, it is selected to every day, all day. Alternatively, it could be scheduled for Monday through Friday, evenings only, etc. Custom schedules can be created by hitting the "edit schedule" button 142.

Fields 144 and 146 are optional fields which allows a user to enter monitor and report descriptions, respectively. A field 148 permits a time out period in seconds, to wait for the entire sequence to complete. That is, if a monitor session takes more than the time out period, an error or warning will be indicated.

The present invention also permits the use of a proxy server. The fields associated with an optional proxy server are shown at 150. In the field 150A, the HTTP proxy is entered. In field 150B, the proxy server user name is entered. In field 150C, the proxy server password is used.

A pull down menu 152 is used for the list order for the monitors. As noted previously, any number of monitor objects can be created to test multiple web sites or to test the same web site in multiple ways. The "list order" indicates where on a list of monitor objects the current monitor object is to be added. In this instance, the list order is "last". Other list orders include "first", "middle",etc.

The web page 96 also includes an "Error" pull down menu 154 and a "Warning" pull down menu 156. In this instance, an error is set if the status is not equal to 200, which is a default, and a warning will occur if status is equal to –994, which is also a default. A status 200 means "good" and is associated with the status field of an HTTP request. The –994 default on the warning is an arbitrary internal coding indicating a software problem. For example, if the software takes more than 10 seconds to respond, a status –994 may be provided.

Figure 5:
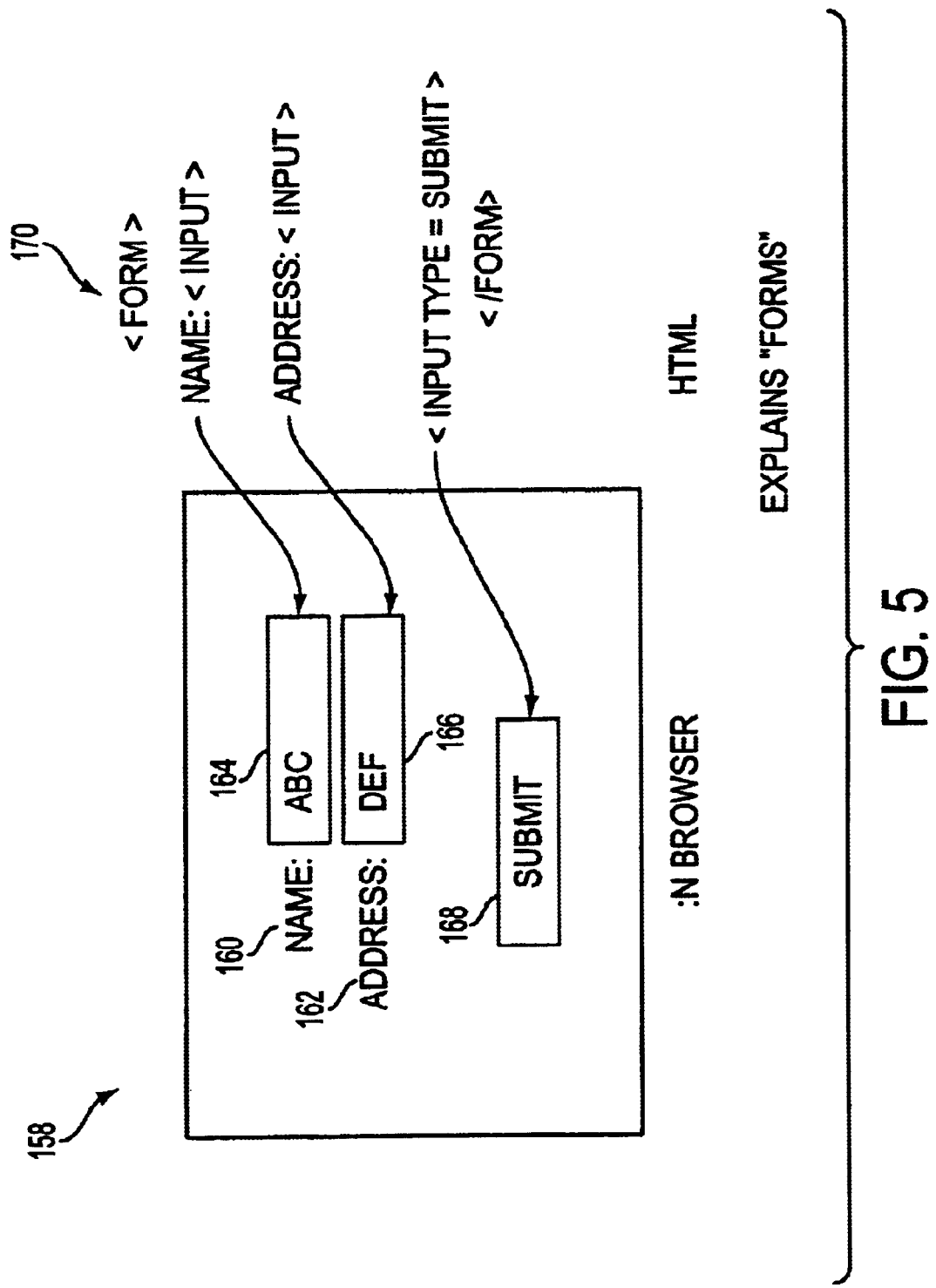
FIG. 5 is a illustration which helps an explain a HTML "form"

In FIG. 5, a form 158 is displayed to illustrate some of the concepts of the present invention. The form includes a first label 160 "name:" and a second label 162 called "address:". Associated with the labels 160 and 162 are entry fields 164 and 166, respectively. Also associated with the form is a "submit" button 168. The form 158 is as it may appear within a browser window. The HTML which creates the form 158 in the browser window is shown generally at 170. The use of HTML 170 to create a form 158 in a browser window is well known to those skilled in the art.

FIG. 6 illustrates a test configuration file 172 produced by filling out the web page 96 and hitting the "Add" monitor button 122. The test configuration file includes a number of labels or "tags" followed by an equal sign and either a parameter or a blank field. Where the field is blank, the tag is ignored and default values are used, if any.

As noted, the monitor description at 174 is an example of a five step transaction. Other tags such as frequency, time out, error frequency, etc. are filed in, while a number of tags are left blank. For example, since a proxy server is not being used, the tags for the proxy server are all left blank. The tags and parameters for step 1 are shown at 176. The "reference type 1" tag is associated with the parameter "URL". The tag reference 1 is associated with parameter http://www.freshtech.com. Steps 2,3,4, and 5 are found at 178, 180, 182, and 184, respectively. It should be noted that the step2 type is "blank", the step3 type is "form", the step4 type is "URL" and the step5 type is "frame". Therefore, this example of a test configuration file 172 illustrates four of the main types of features which can be verified and tested by the process of the present invention.

Figure 7:
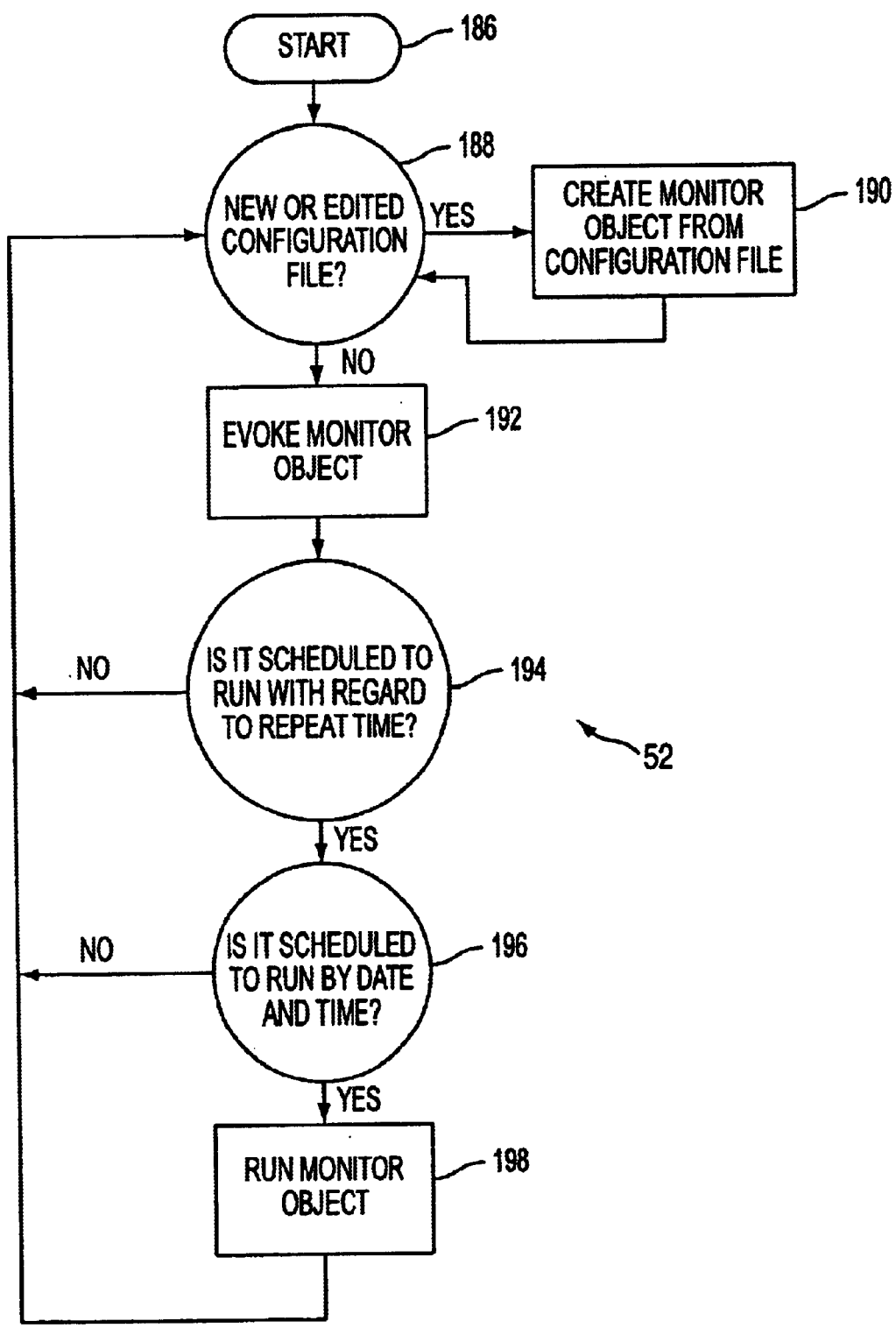
FIG. 7 is a flow-diagram illustrating the "ANALYZE CONFIGURATION FILE ACTIVATION SCHEDULE" operation of FIG. 2B.

In FIG. 7, a flow diagram of the operation 52 in FIG. 2B is shown in greater detail. The process 52 begins at 186, and in operation 188, it is determined whether a new or edited configuration file has been created as set forth above. If so, a "monitor object" is created from the configuration file for one time execution in an operation 190. The creation and use of software objects are well known to those skilled in the art. Then, in an operation 192, the monitor object is "invoked". By invoked it is meant that the monitor object is activated for use. In an operation 194, it is determined whether the monitor object is scheduled to run with regards to repeat time. If it is not, process control is returned to operation 188. If it is, it is determined in operation 196 whether the monitor object is scheduled to run by date and time. If not, process control is again returned to operation 188. If the monitor object is scheduled to run with regards to both repeat time and by date and by time, then the monitor is "run" in an operation 198. By "run" it is meant that the monitor object is caused to perform the process of the present invention to test a web site.

Figure 8:
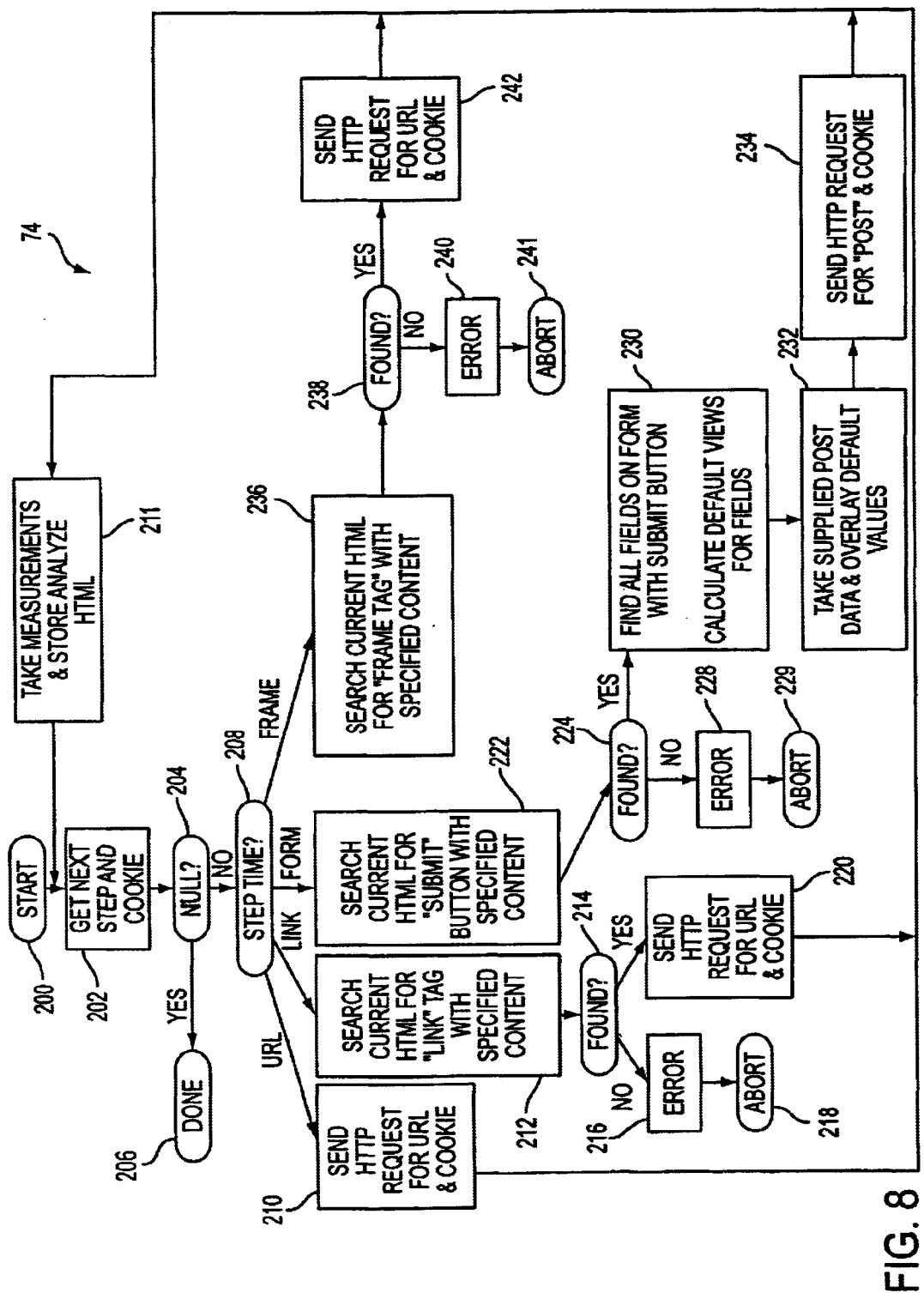
FIG. 8 is a flow-diagram of the "SEND HTTP TO WEB SITE AND RECEIVE HTTP/HTML" operation of FIG. 2B.

In FIG. 8, a flow diagram illustrates the process 74 of FIG. 2B in greater detail. The process 74 begins at 200, and in an operation 202, the "next step" and cookie is retrieved. The next step is the next test step as described above. The "cookie" is a data file received from the web site being tested that includes information concerning user preferences, user history, etc. An operation 204 determines whether the next step is a null and if so, the process is completed at 206. If there is a next step, operation 208 determines the step type, as described below.

If operation 208 determines that the next step type is "URL" a step 210 sends an HTTP request for the URL and the cookie associated with that URL. Process control is then turned over to an operation 211 which takes measurements based on the HTTP request and response, analyzes received HTML document for expected content and errors using methods such as matching against string values, regular expressions, and calculated valves and stores them in a database. Error analysis and matching methods are well known to those skilled in the art. Process control then returns to operation 202.

If operation 208 determines that the step type is a "link", an operation 212 searches the current HTML document for a "link" tag having the specified content. In operation 214 determines whether the appropriate "link" tag has been found and, if not, an error message 216 is generated the process aborts at 218. If the link tag is found by the operation 214, an operation 220 sends an HTTP request for the URL and the cookie and process control reverts to operation 211.

If operation 208 determines that the step type is "form", an operation 222 searches the current HTML document for a "submit" button with the specified content. An operation 224 determines whether the appropriate "submit" button has been found, and if not, operation 228 determines that there is an error and the process 76 aborts at 229. If the appropriate submit button is found by operation 224, an operation 230 finds all fields on the form with the submit button and determines or calculates the default values for this field. An operation 232 then takes the supplied post data and overlays the default values such that all appropriate fields have been filled. An operation 234 then sends an HTTP request "post" plus the cookie and process control returns to 211.

If operation 208 determines that the step type "frame" an operation 236 searches the current HTML document for a "frame" tag. An operation 238 determines whether the appropriate frame tag has been found. If not, an operation 240 indicates an error and the process 76 aborts at 241. If the appropriate frame tag has been found by operation 238, an operation 242 sends an HTTP request for the URL and the cookie. Process control then returns to operation 211.

Figure 8A:
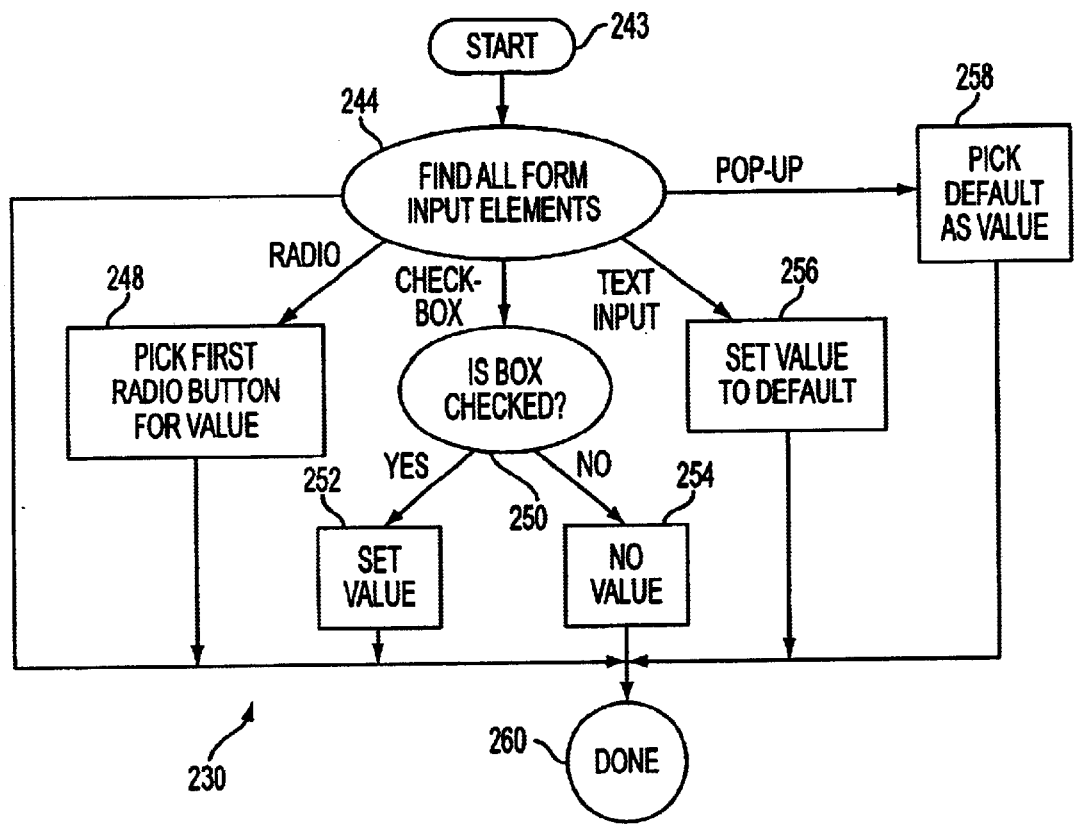
FIG. 8A is a flow-diagram detailing "FIND ALL FIELDS ON FORM WITH SUBMIT BUTTON" operation of FIG. 8.

In FIG. 8A, the operation 230 of FIG. 8 is described in greater detail. The operation 230 begins at 243 and, in an operation 244, all form input elements are determined. If a form input element is not recognized, then the process is complete at 260. If operation 244 finds a radio button input element, operation 248 picks the first radio button for the value. If the operation 244 finds a check-box for the input element, an operation 250 determines whether the box is checked. If it is, an operation 252 sets the value, and if it is not an operation 254 indicates that there is no value. If an operation 244 finds a text input element, an operation 256 sets the value to the default string. If operation 244 finds pop-up menu, an operation 258 picks the default as the value. The operation 230 is then complete at 260.

Figure 8B:
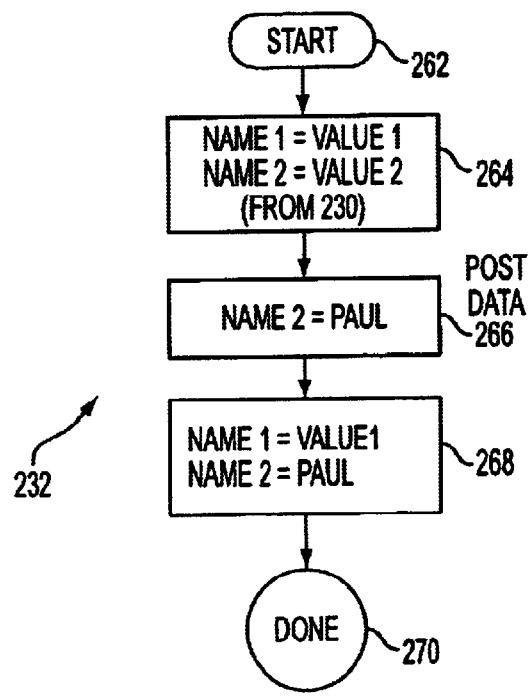
FIG. 8B is a flow-diagram illustrating the "TAKE SUPPLIED POST DATA AND OVERWRITE VALUES" operation of FIG. 8.

In FIG. 8B, the operation 232 of FIG. 8 is illustrated in greater detail. The operation 232 begins at 262 and, in an operation 264, values from operation 230 (see FIG. 8 and FIG. 8A) are written into the name tags. For example, name1 is set to an arbitrary or default value1, name2 is set to an arbitrary or default value2, etc. Next, in an operation 266, the "post data" entered by the user is used to override the appropriate name tags. In this instance, the name tag "name 2" is set to the data "Paul". The final, merged data is illustrated at 268 and the operation is completed at 270.

Figure 9:
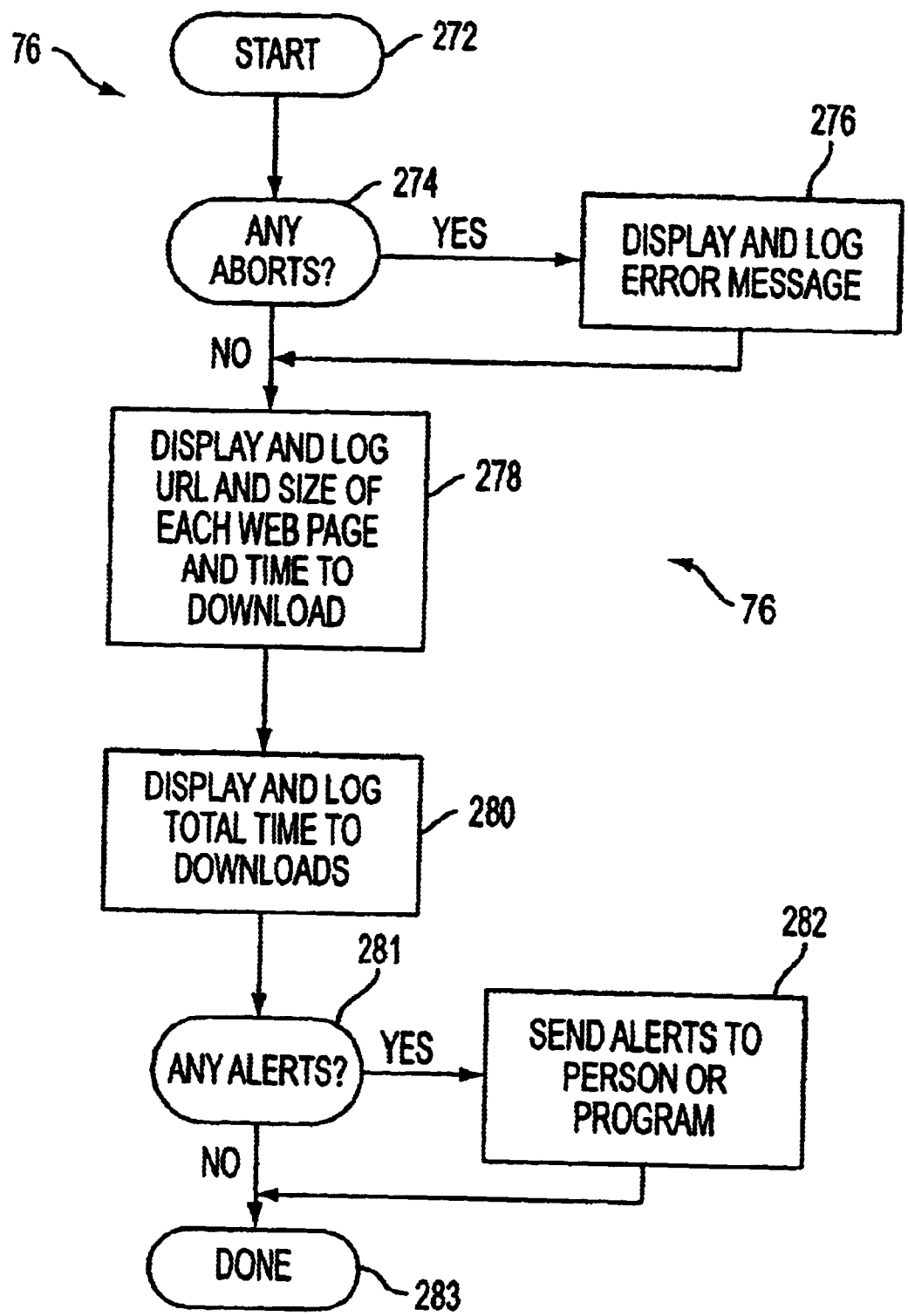
FIG. 9 is a flow-diagram illustrating the "ANALYZE AND STORE RESULTS IN LOG FILE" operation of FIG. 2B.

In FIG. 9, the operation 76 of FIG. 2B is illustrated in greater detail. The operation 76 begins at 272, and in an operation 274, it is determined whether there are any aborts that occurred within the operation 74. If there were, an operation 276 displays and logs a an error message. If there were not any aborts, then the operation 74 terminated normally in an operation 278, and the process displays and logs the URL and the size of each web page and the time it took to download into a log file. An operation 280 displays and logs the total time for the download in an operation 280. In an operation 281 it is determined whether there are any alerts. If there were, an operation 282 activates an operation to notify a person using a mechanism such as e-mail or pager or cause a user-specified operation to start. The operation 76 is then complete at 283.

Figure 10:
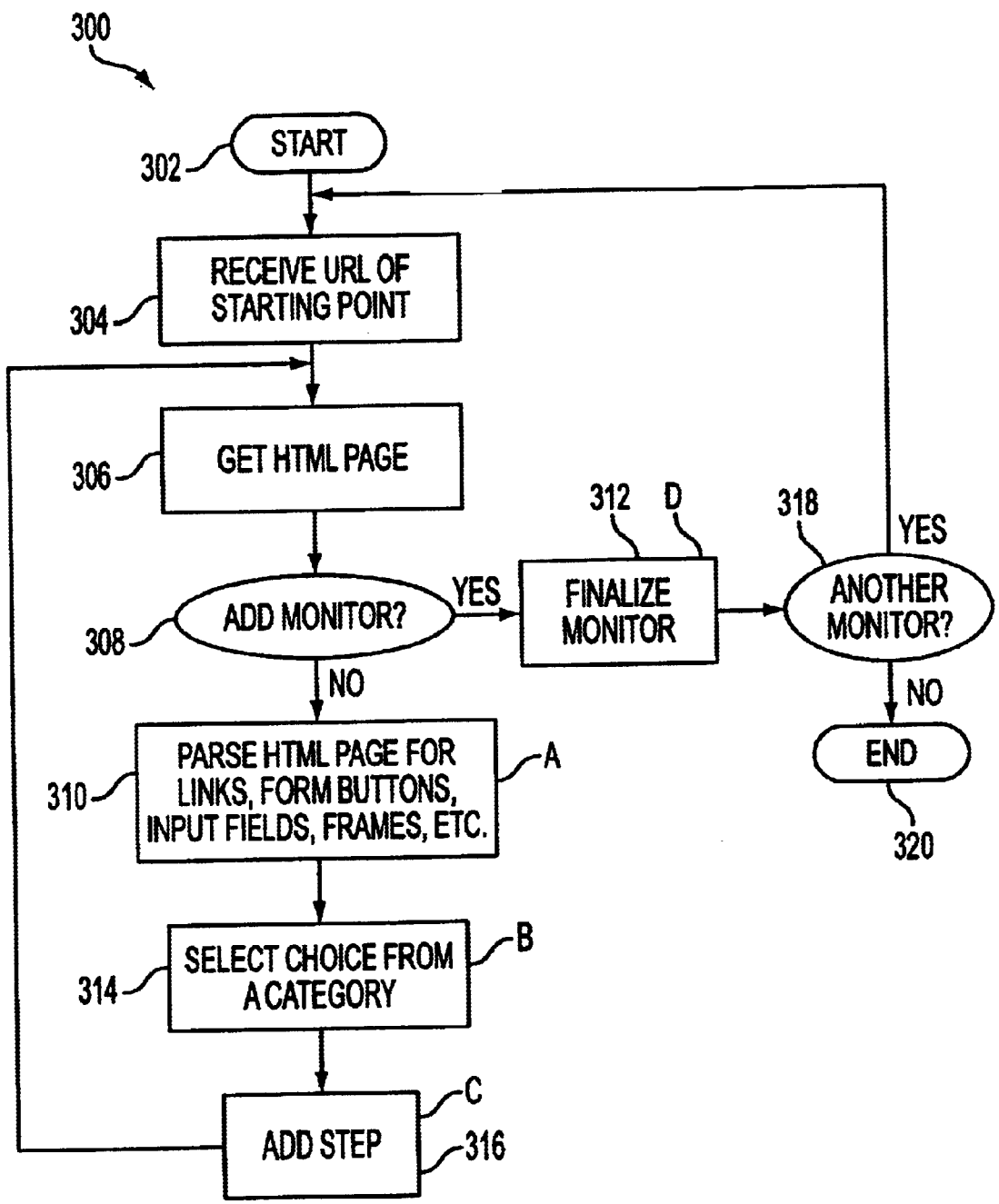
FIG. 10 is a flowchart showing a method for creating a monitor in an automated manner, in accordance with an embodiment of the present invention.

FIG. 10 is a flowchart showing a method 300 for creating a monitor in an automated manner, in accordance with an embodiment of the present invention. The method begins at operation 302, and pre-process operations may be performed.

In a receiving operation 304, the URL of a starting point for the method 300 is obtained. The URL may be the URL of a home page, or other appropriate starting point as determined by the tester. Similar to step1 of FIG. 4A, the starting point URL is merely a starting point for the test.

Next, in a "get HTML page" operation 306, the HTML code for the selected web page is obtained. Generally, this is accomplished using the Internet via an ISP, however, local area networks, single computer configurations, and direct internet backbone connections may also be utilized.

A determination is then made as to whether to add the monitor, in operation 308. If the monitor is to be added, the method 300 continues with a finalization operation 312. However, if the monitor is not to be added, the method 300 continues with a parsing operation 310. Generally, during the first iteration of method 300 the monitor will not be added because no monitor functions will have yet been generated. Thus, during the first iteration the method 300 generally continues to operation 310.

The received HTML page is then parsed in a parsing operation 310. As described in greater detail subsequently, the HTML page is parsed for tags, such as link tags, form buttons tags, input field tags, frame tags, and redirect tags during the parsing operation 310.

In a selection operation 314, a user selects a tag they wish to monitor. Preferably, the user is able to select a tag from a plurality of categories. As mentioned previously, the categories are tag categories, such as link tags, form buttons tags, input field tags, frame tags, and redirect tags.

Next, in an adding operation 316, the selected tag is added to the monitor. Generally, the user will add a plurality of tags to a monitor before finalizing the monitor, however, there may be situations in which only one tag needs to be included in a particular monitor. The method 300 then continues with a another get HTML page operation 306 until all desired tags are added to the monitor.

In a finalization operation 312, the monitor is finalized. Finalization includes performing additional functions with the monitor in order for it to be in condition for testing. These type and scope of these additional functions will be apparent to those skilled in the art.

A decision is then made as to whether an additional monitor is to be created, in operation 318. After finalization, the monitor is added to a list of monitor to be utilized during testing. Then, the method 300 continues with another receiving operation 304 if another monitor is desired. Otherwise, the method is completed in operation 320. It should be borne in mind that FIG. 10 is related to FIG. 6. Specifically, the adding operation 316 refers to the various reference Types in FIG. 6.

Figure 10A:
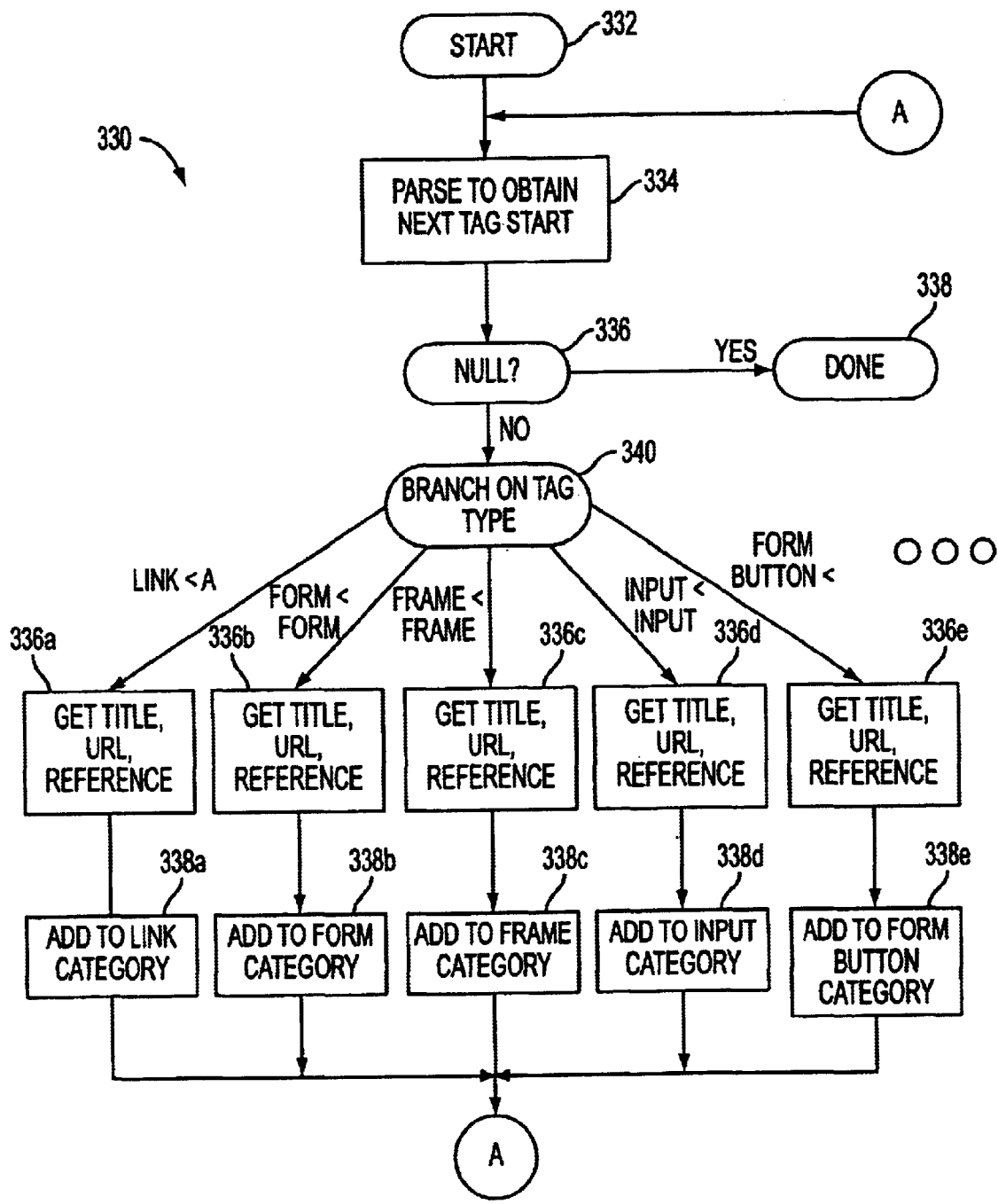
FIG. 10A is a flowchart showing a parsing process for parsing an HTML page for tags, in accordance with an embodiment of the present invention.

FIG. 10A is a flowchart showing a parsing process 330 for parsing an HTML page for tags, in accordance with an embodiment of the present invention. The parsing process 330 begins with an initial operation 332 in which pre-process operations are performed. Pre-process operations include obtaining the HTML page and other preprocess operations that will be apparent to those skilled in the art.

In a parsing operation 334, the HTML page is parsed to obtain the next tag. In addition, the HTML page is preferably parsed for image links, such as GIF image links. Essentially, each HTML page, or form, includes a tag that indicates the start of the form. Further there are various input field tags inside the start tag. Frames include a tag that indicates that the code is for a frame. Generally, all tags and links include a name and a display item that is displayed.

A determination is then made as to whether a NULL character has been found, in operation 336. If a NULL character has been found, the process 330 is completed in operation 338. A NULL character indicates then end of the HTML page has been reached, thus the parsing process 330 is complete. If a NULL character has not been found, the parsing process 330 continues with a branching operation 340.

In a branching operation 340, the parsing process 330 branches depending on the tag type obtained in operation 334. The parsing process 330 continues to a get title operation 336a–336e depending on the tag type. During the get title operation 336a–336e, additional information concerning the tag is obtained.

Preferably, the names and display items are displayed to the user for later selection. Thus, if a link is "click here for food," this display item is extracted from the form and displayed to the user for later selection. Also, input items have names, for example, an input item may have a name such as "First Name" or "Code Number." These names are also extracted. Hence, during the get title operation 336a–336e the descriptive part of the obtained tag is extracted, and added to the to serve as categories for user selection in operation 338a–338e. That is, operation 338a adds the descriptive part of the tag to the link category, operation 338b adds the descriptive part of the tag to the form category, operation 338c adds the descriptive part of the tag to the frame category, operation 338d adds the descriptive part of the tag to the input category, and operation 338e adds the descriptive part of the tag to the button category.

FIGS. 10B–10g illustrate an interface used to create monitors during the process of FIG. 10, in accordance with an embodiment of the present invention. More particularly, these are the web pages used to create a "monitor object" which will be used to test and gather data concerning the operation of a web site under test. It should be noted that multiple monitors monitoring multiple web sites or monitoring a single web site in multiple fashions can be operating simultaneously. This is a well-known function of an object oriented programming and of a multi-tasking computer system. However, the following description will be in the context of creating a specific monitor object which will test the functionality of a web page. The user interface may be tailored to the user, either by identifying the user individually, or by association with the user, such as a group or security level, or some other form of classification. This tailoring may be preformed before the first test is preformed, or may be incorporated into the first or latter tests for subsequent use.

FIG. 10B is an illustration showing a step2-monitor-editing-page 350, in accordance with one embodiment of the present invention. The step2-monitor-editing-page 350 includes a link list menu 352, a form button list 354, an input item list 356, and function buttons 358, 360, and 362.

After the HTML page has been parsed, available links are displayed in the link list 352, available forms and form buttons are displayed in the form button list 354, and available input items are displayed in an input item list 356. The user is then allowed to select a category to add to the monitor. In the example of FIG. 10B, a link "PRODUCTS" has been selected from the link list 352. The user's selection is then added to the monitor in response to a user selection of the "Add Step" button 360. The parsing is preferably based on information contained on the web page. This information may be obtained automatically or entered manually.

FIG. 10C is an illustration showing a step3-monitor-editing-page 370, in accordance with an embodiment of the present invention. Similar to step2, the step3 monitor editing page 370 includes a link list menu 352, a form button list 354, an input item list 356, and function buttons 358, 360, and 362.

As is step2, available links in the step3 page 370 are displayed in the link list 352, available forms and form buttons are displayed in the form button list 354, and available input items are displayed in the an input item list 356. The user is then allowed to select a category to add to the monitor. In the example of FIG. 10C, a form "Search" has been selected from the form button list 354. Further a keyword "John" was added (shown in FIG. 10D). The user's selection is then added to the monitor in response to a user selection of the "Add Step" button 360. The lists provided can be predetermined by a number of different factors, but in one preferred embodiment information provided on the web page itself will prompt certain selections on the list. Subsequent lists then also be influenced by a combination of prior selections and information from the web page.

FIG. 10D is an illustration showing a step4 monitor editing page 380, in accordance with another embodiment of the present invention. The step4 monitor editing page 380 includes a link list menu 352, a new URL text box 357, and function buttons 358, 360, and 362.

As is step2 and step3, available links in the step4 page 380, further users are allowed to enter a URL for a new web page in the new URL text box 357. In the example of FIG. 10D, the user has entered a new URL in the new URL text box 357. The user's selection is then added to the monitor in response to a user selection of the "Add Step" button 360.

FIG. 10e is an illustration showing a step5 monitor editing page 390, in accordance with an embodiment of the present invention. Included in the step5 page 390 is a link list 352, a frame list 364, and new URL text box 357. In the example of FIG. 10e, the user has selected a frame "contents" from the frame list 364.

FIG. 10f is an illustration showing a step6 monitor editing page 400, in accordance with an embodiment of the present invention. Included in the step6 page 400 is a link list 352, and new URL text box 357, and function buttons 358, 360, and 362. In the example of FIG. 10f, the user has decided he is finished editing the monitor, and informs the system by selecting the "Add Monitor" function button 362.

Figure 10G:
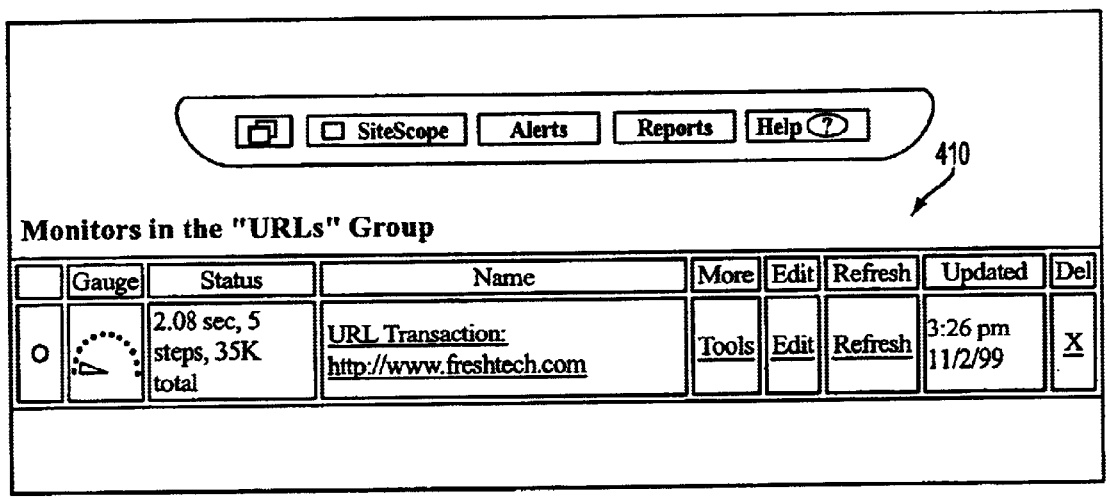
FIG. 10G is an illustration showing a completed monitor display, in accordance with an embodiment of the present invention.

FIG. 10g is an illustration showing a completed monitor display 410, in accordance with this embodiment of the present invention. The example of FIG. 10g shows that a monitor has been added and successfully run on the selected web page. More particularly, in this example, the monitor took 2.08 sec, and 5 steps to complete. Further shown is the name of the URL transaction and various editing options.

Figure 11:
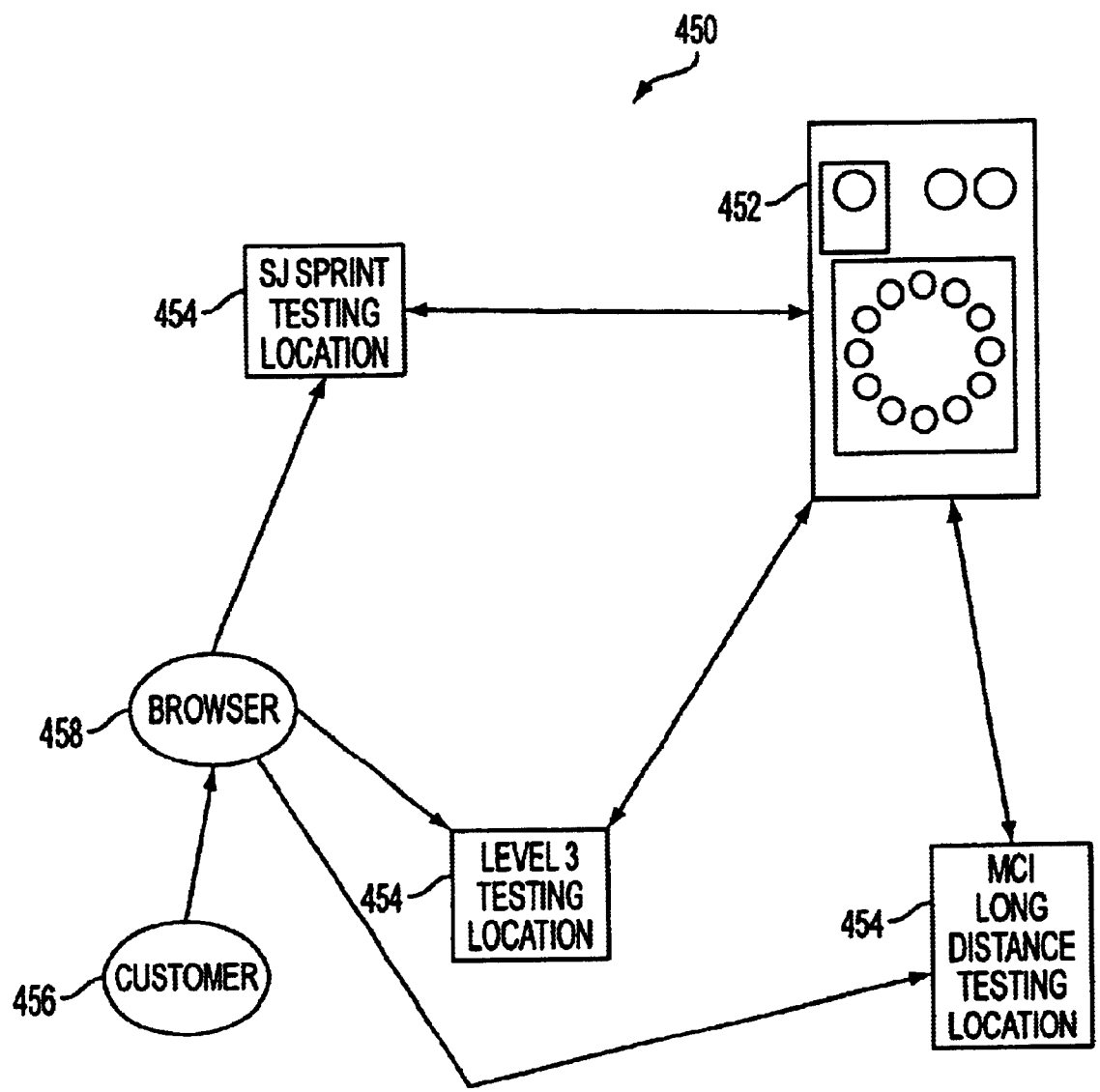
FIG. 11 is an illustration showing an exemplary hardware configuration for a monitor system, in accordance with an embodiment of the present invention.

FIG. 11 is an illustration showing an exemplary hardware configuration for a monitor system 450, in accordance with an embodiment of the present invention. The monitor system 450 includes a data center 452, testing locations 454, and a customer location 456 running a browser 458.

In use, the monitor system 450 monitors one or more tested systems. Monitoring is accomplished using various manners. One manner is via a Web configuration utilizing either the Internet or an extranet. Another manner is directly through the systems backend services, such as a relational database system. The monitor system 450 may be either local to the testing servers or located remotely. Remote monitoring is generally accomplished via a TCP/IP connection.

In one embodiment, the data center 452, which is the server location of the site being tested, is in communication with various remote testing locations 454. The testing locations 454 actually test the site at the data center. In communication with the testing locations 454 are customers 456 running browsers 458. Thus, a customer is allowed to test the web site at the data center 452 by controlling a testing location 454 using their browser 458. It should borne in mind that the various testing locations 454 can use different backbone carriers. For example, one testing location may use Sprint, while another uses Level 3 Communications, Inc., and yet another testing location may use MCI as a backbone carrier.

Thus, one embodiment of the present invention allows monitoring at the same location as the data center 452. Another embodiment allows monitoring at remote locations, as shown in FIG. 11.

Figure 12:
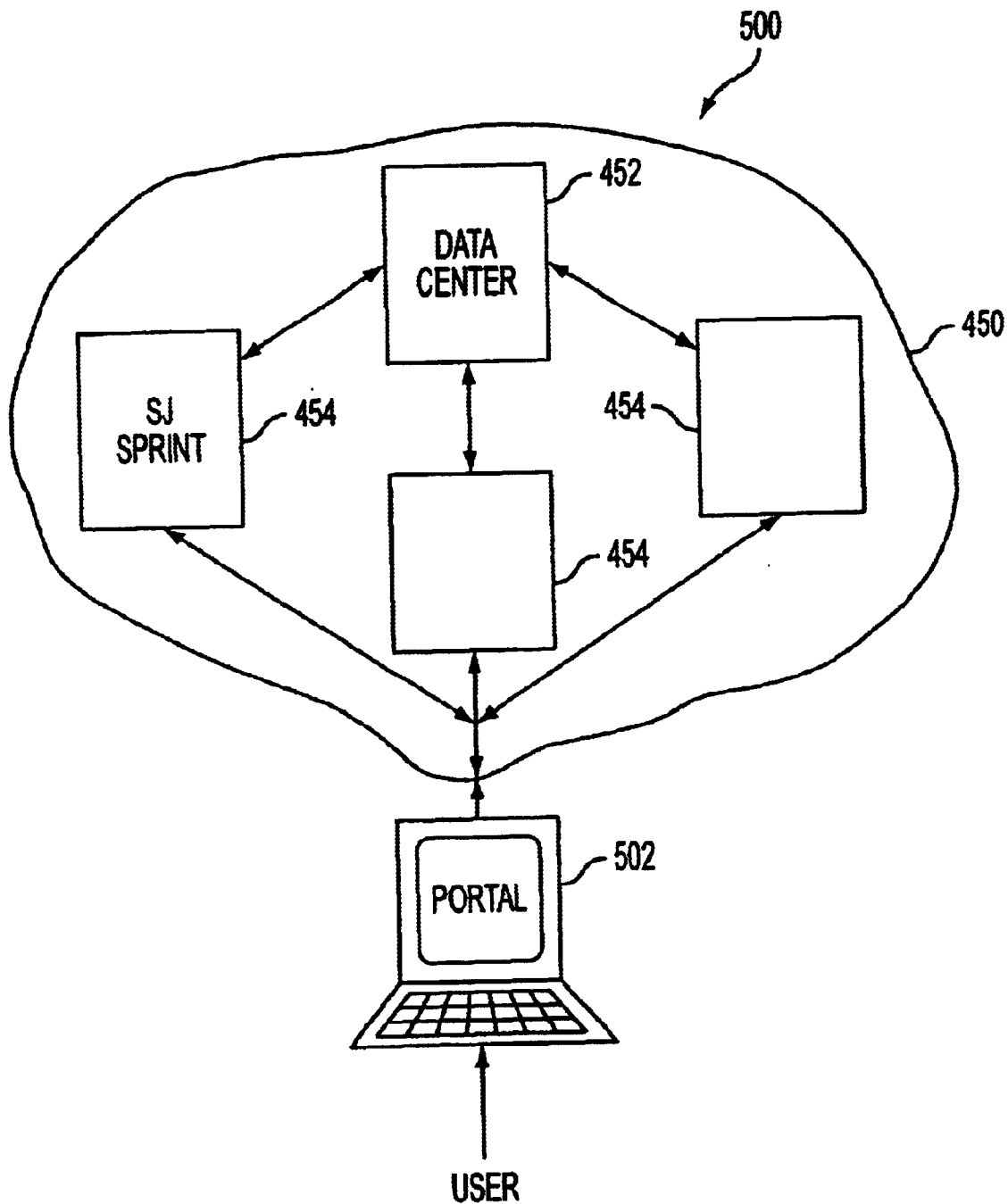
FIG. 12 is an illustration showing an Enterprise portal system, in accordance with an embodiment of the present invention.

FIG. 12 is an illustration showing an Enterprise portal system 500, in accordance with an embodiment of the present invention. Included in the Enterprise portal system 500 is distributed computing system 450, such as the monitor system described previously, testing locations 454, and an enterprise portal 502.

In use, the enterprise portal 502 service as a single interface to the distributed computing system 450. In this manner, the distributed nature of a distributed computer system is hidden from the user, thus enabling the user to take full advantage of the benefits of the distributed computer system, without the increased complexity that conventionally accompanied distributed computing environments. Hence, the enterprise portal 502 allows the distributed hardware configuration of FIG. 11 to interact with a user in a similar manner as a non-distributed computing environment.

Figure 13:
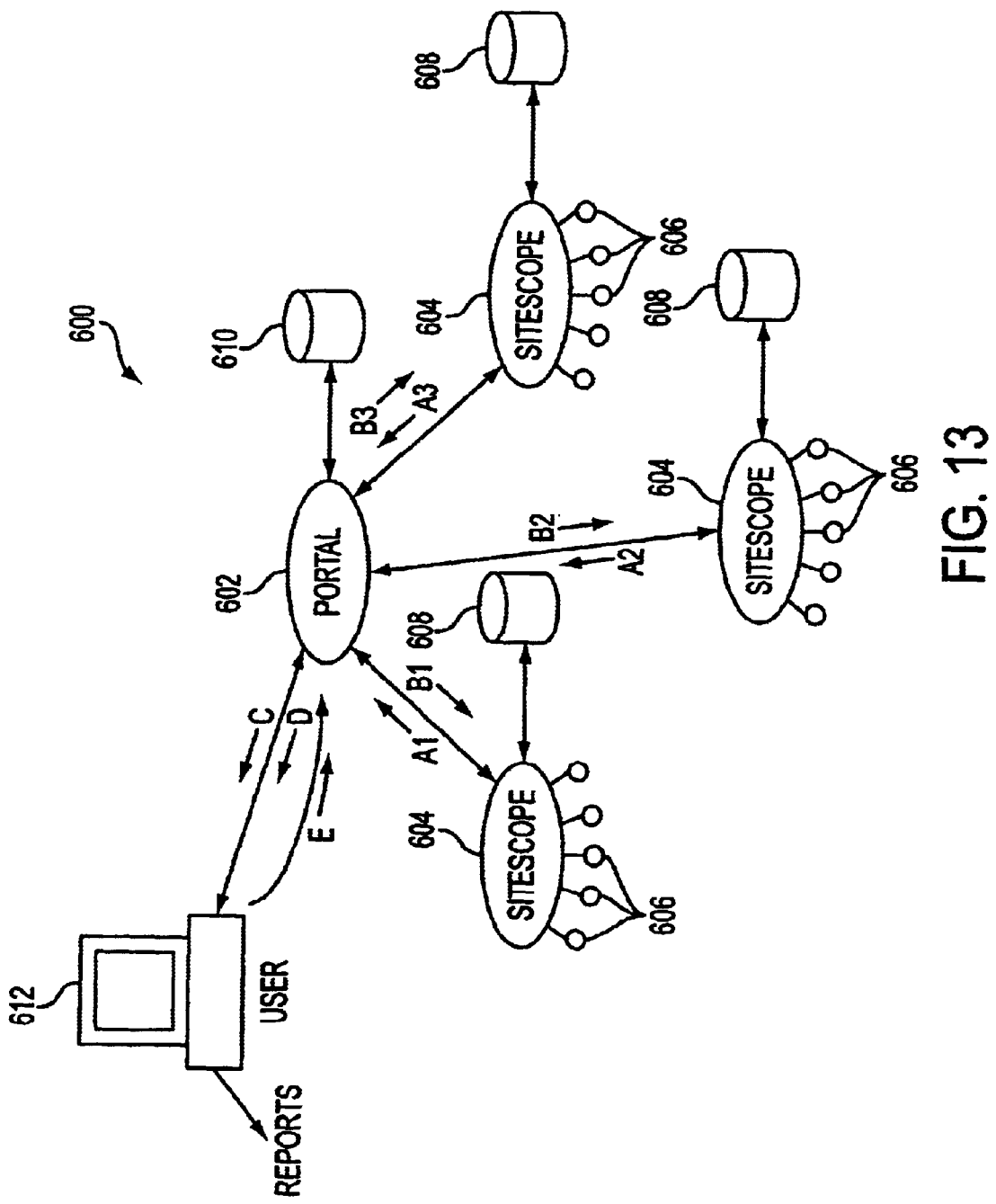
FIG. 13 is dataflow diagram showing an Enterprise portal system, in accordance with another embodiment of the present invention.

FIG. 13 is dataflow diagram showing an Enterprise portal system 600, in accordance with another embodiment of the present invention. Included in the Enterprise portal system 600 is a portal 602, and sitescope locations 604 in communication with various site servers 606. In addition, each sitescope 604 includes its own local database 608, and the portal 602 includes a portal database 610, which is essentially a unified form of the local databases 608.

In use, the portal 602 acts like a collecting point for the information provided by the sitescope locations 604. Specifically, each sitescope location 604 receives monitor results from the various site servers 606 it is monitoring. These monitor results are then collected by the portal 602. Further, the portal 602 provides monitor configuration information to each sitescope location 604. In this manner, a user 612 may provide monitor configuration information to hundreds of servers merely by providing the monitor configuration information to the portal 602. Once the portal 602 receives the monitor configuration information from the user 612, the portal transmits the monitor configuration information to the appropriate sitescope locations 604, which in turn provide the monitor configuration information to specified site servers 606. The user interface is tailored to the user, either by identifying the user individually, or by association with the user, such as a group or security level, or some other form of classification. This tailoring may be performed before the first test is performed, or may be incorporated into the first or latter tests for subsequent use. Tailoring of the interface also included tailoring of information appearing on the interface, including selection choices. This makes the system much easier to use on a per-user basis, and allows for such things as group identification and security clearance.

The user 612 typically interfaces with the portal 602 utilizing a browser. Via the browser, the user 612 may monitor and evaluate the status of the various site servers 606. This information may be viewed as a summary, or detailed information on specific site servers 606 may be viewed, depending on the desire of the user 612. For example, if the user 612 owned a number of particular site servers 606, the user 612 could use the portal 602 to view information on their servers. In addition, if the user 612 was a customer of the portal owner, the owner of the portal 602 may limit the site servers 606 that may be viewed by the user 612 to those site servers 606 actually owned by the user 612. In another case, the user 612 may have a very specific problem that they are trying to solve, in which case they may limit their view through the portal 602 to the specific site server 606 that they are trying to fix.

The portal 602 may also be used to generate reports for the user 612 using the portal database 610. These reports may include information such as web site performance during a given time period, the time required to process various transactions at the web site, and transaction errors. Then, via forms located on the portal 602, the user 612 can make appropriate changes to specified web sites.

Figure 14:
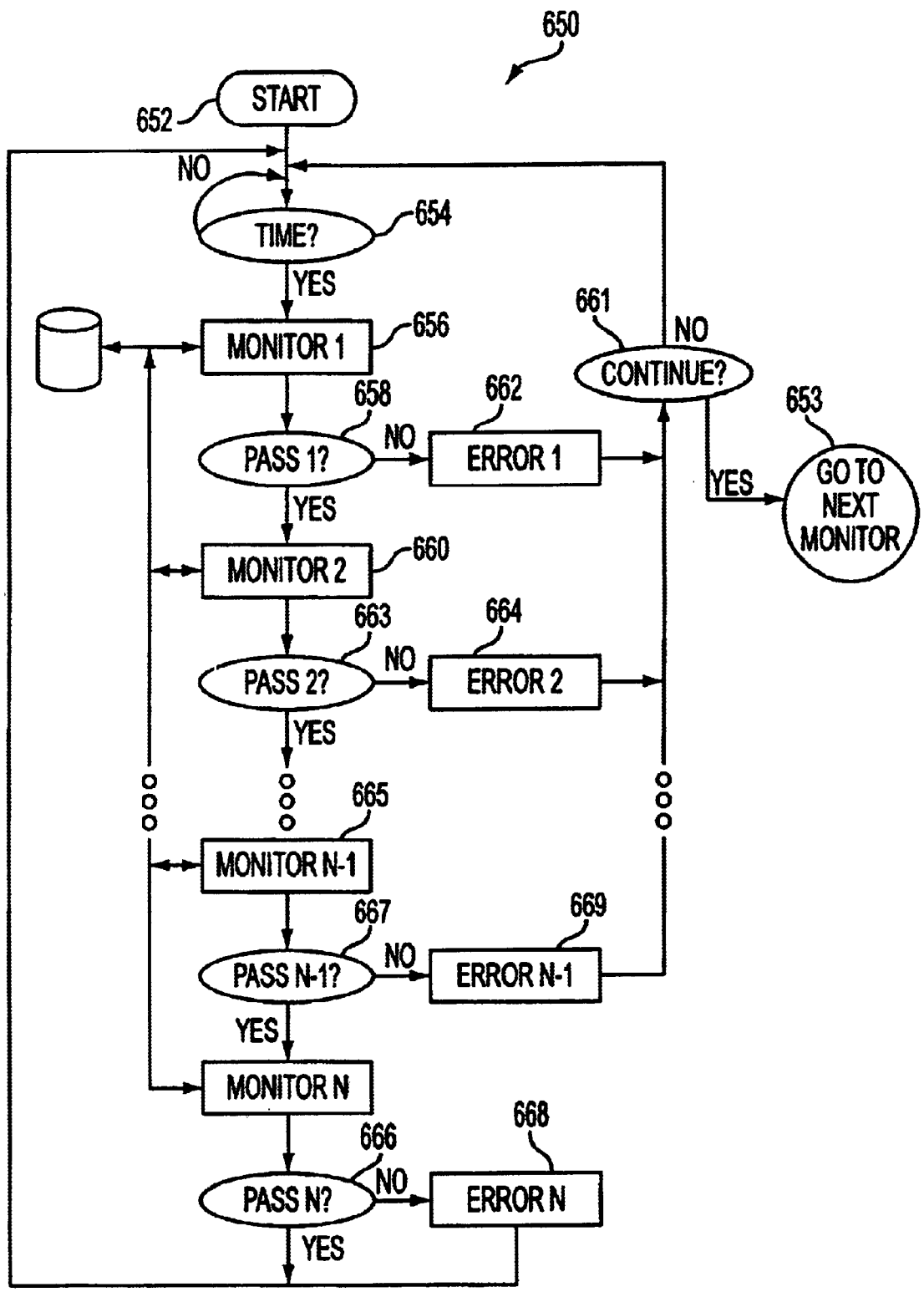
FIG. 14 is a flowchart showing an business transaction chain monitor process, in accordance with an embodiment of the present invention.

FIG. 14 is a flowchart showing an business transaction chain monitor process 650, in accordance with an embodiment of the present invention. The business transaction chain monitor process 650 allows a user to check and tabulate a complex server system by checking the status readings of a specified set of other monitors and/or groups.

In this manner, end-to-end transactions may be monitored using a collection of several monitors. For example, a user could test: placing an order on a web site, then check if the order status was updated, if a confirmation email was received, if the order was added to the order database, and if the order was transferred to a legacy system. To accomplish this the user creates a composite monitor that uses other monitors to test each of the individual systems, as described below.

In an initial operation 652, pre-process operations are performed. Pre-process operations include creating the individual monitors which will be utilized to monitor the system, creating the composite monitor which utilizes the individual monitors, and other pre-process operations that will be apparent to those skilled in the art.

In a timing operation 654, the system checks whether the time for the next testing has been reached. An ebusiness transaction chain monitor process 650 can be set to run at given time intervals, depending on the type of testing to be executed. If the time for the next testing has not been reached, the system waits a predetermined amount of time and then compares the time with the scheduled testing time in another timing operation 654. However, if the time for the next testing has been reached, the process 650 continues with a first monitor operation 656.

In a first monitor operation 656, the first monitor is executed and the results are saved in a database. As discussed previously, the user may utilize a plurality of monitors to test a particular web site. The order of execution of the monitors depends on the order decided upon by the user, described in greater detail subsequently with respect to FIGS. 16A–16B.

In a first pass operation 658, the results obtained in the first monitor operation 656 are compared with predetermined pass criteria. If the results fall within the bounds determined by the predetermined pass criteria, the process 650 continues with the second monitor operation 660. However, if the results do not fall within the bounds of the predetermined pass criteria, the process 650 continues with a first monitor error operation 662.

In the first monitor error operation 662, the particular error achieved is logged, using the database. In one embodiment, the user may further process the error message. A decision is then made to whether to continue the process 650 or to end the process, in operation 661. For every error encountered, the user can define whether the system should continue monitoring or end. In this manner, the user may create complex alert logic for a particular composite monitor. For example, the system could stop monitoring and alert the user when five or more monitors in a group of eight are in error, or when three or more groups have monitors with errors. In addition, the system could be programmed to perform specified actions when these events occur.

In a second monitor operation 660, the second monitor is executed and the results are saved in a database. As discussed previously, the user may utilize a plurality of monitors to test a particular web site. The order of execution of the monitors depends on the order decided upon by the user, described in greater detail subsequently with respect to FIGS. 16A–16B. Further, the results achieved from the execution of the first monitor are preferably used as inputs for the second and subsequent monitors, if appropriate.

In a second pass operation 663, the results obtained in the second monitor operation 660 are compared with predetermined pass criteria. If the results fall within the bounds determined by the predetermined pass criteria, the process 650 continues with the another monitor operation. However, if the results do not fall within the bounds of the determined by the predetermined pass criteria, the process 650 continues with a second monitor error operation 664.

In the second monitor error operation 664, the particular error achieved is logged, using the database. Then, as with the first monitor error operation 662, a decision is then made to whether to continue the process 650 or to end the process, in operation 664.

This process continues as described above with subsequent monitors being executed and the results checked for each monitor. For example, monitor operation 665, pass operation 667, and monitor error operation 669. After the final monitor pass operation 666 or final monitor error operation 668, the process ends until the next scheduled execution time, as determined in the timing operation 654. Thus, the monitors used in the ebusiness transaction chain process are inter-dependent on one another via the database. Specifically, the database allows monitors to reference values provided by other monitors for web site testing.

Figure 15:
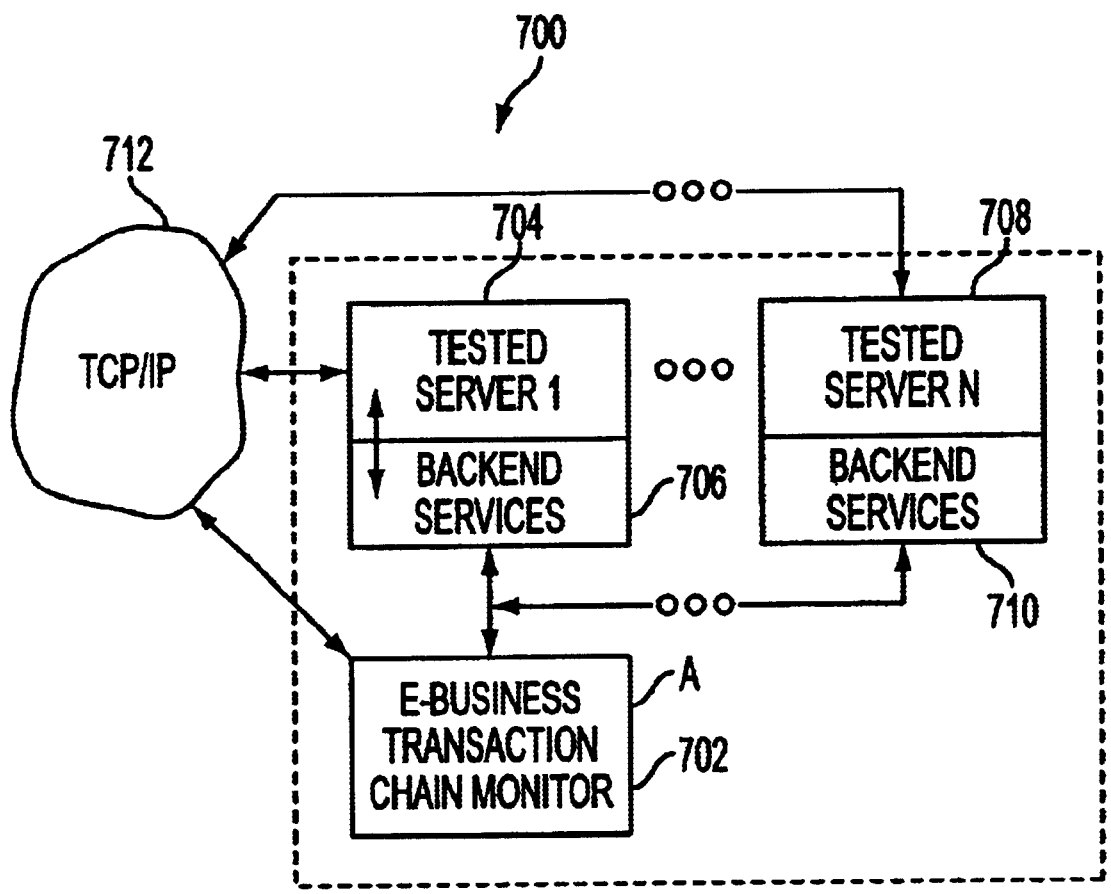
FIG. 15 is an illustration showing a hardware configuration suitable for executing the business transaction chain process, in accordance with an embodiment of the present invention.

FIG. 15 is an illustration showing a hardware configuration 700 suitable for executing the ebusiness transaction chain process, in accordance with an embodiment of the present invention. The hardware configuration 700 includes an ebusiness transaction chain monitor 702, a first tested server 704 having a first backend 706, and a second tested server 708 having a second backend 710.

As discussed previously, the ebusiness transaction chain monitor 702 monitors a plurality of tested servers, such as the first tested server 704 and the second tested server 708. The ebusiness transaction chain monitor 702 can monitor using the Internet 712. In addition, the ebusiness transaction chain monitor 702 is generally capable of monitoring the tested servers via their backend services, such as the first backend 706 and the second backend 710. One example of a backend service is a relational database. Further, the ebusiness transaction chain monitor 702 may be local to the tested system, or remote as described reference to FIG. 11.

Figure 16B:
FIG. 16B is an illustration showing an business transaction chain monitor interface 750, in accordance with another embodiment of the present invention.

FIGS. 16A–16B are illustrations showing an ebusiness transaction chain monitor interface 750, in accordance with an embodiment of the present invention. FIG. 16A shows a composite monitor 752 having individual monitors 754 defined in a predetermined order. In use, the user is allowed to select which monitors 754 to include in the composite monitor, and in what order they are to be executed.

In addition, the ebusiness transaction chain monitor interface 750 includes an update list 756. The user utilizes the update list 756 to define how often the composite monitor 752 is to be executed. Both FIGS. 16A and 16B show examples of further advanced options that may be used to further define the composite monitor 752. As will be apparent to those skilled in the art, various permutations and embodiments of the ebusiness transaction chain monitor interface 750 can be created depending on the needs of particular users. Those shown in FIGS. 16A and 16B are merely exemplary to show various options that may be added.

Figure 17A:
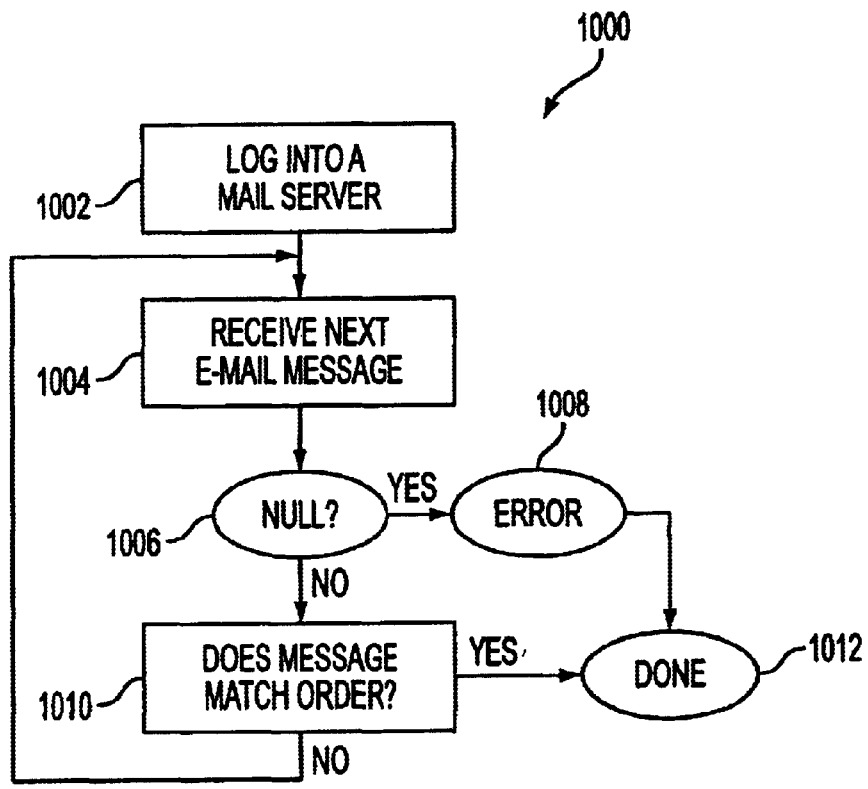
FIG. 17A is a flowchart showing an email conformation process, in accordance with an embodiment of the present invention.
Figure 17B:
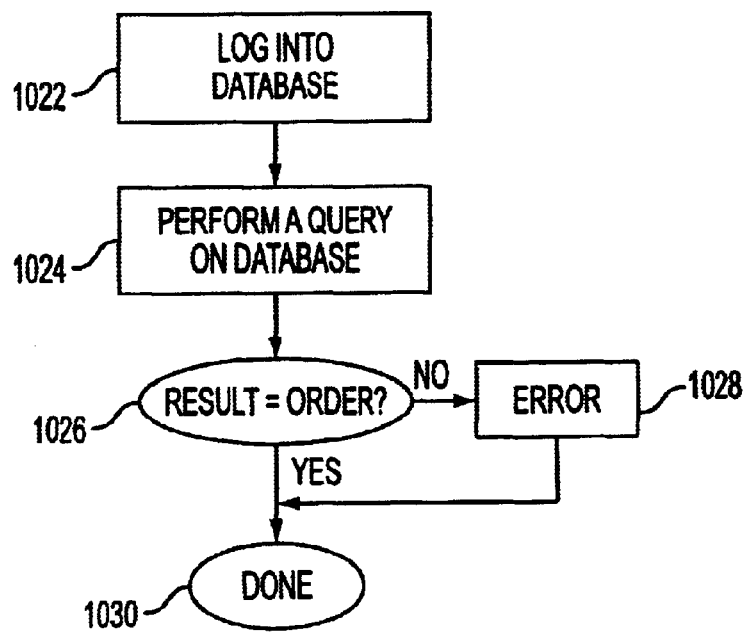
FIG. 17B is flowchart showing a database confirmation process, in accordance with one aspect of the present invention.
Figure 17C:
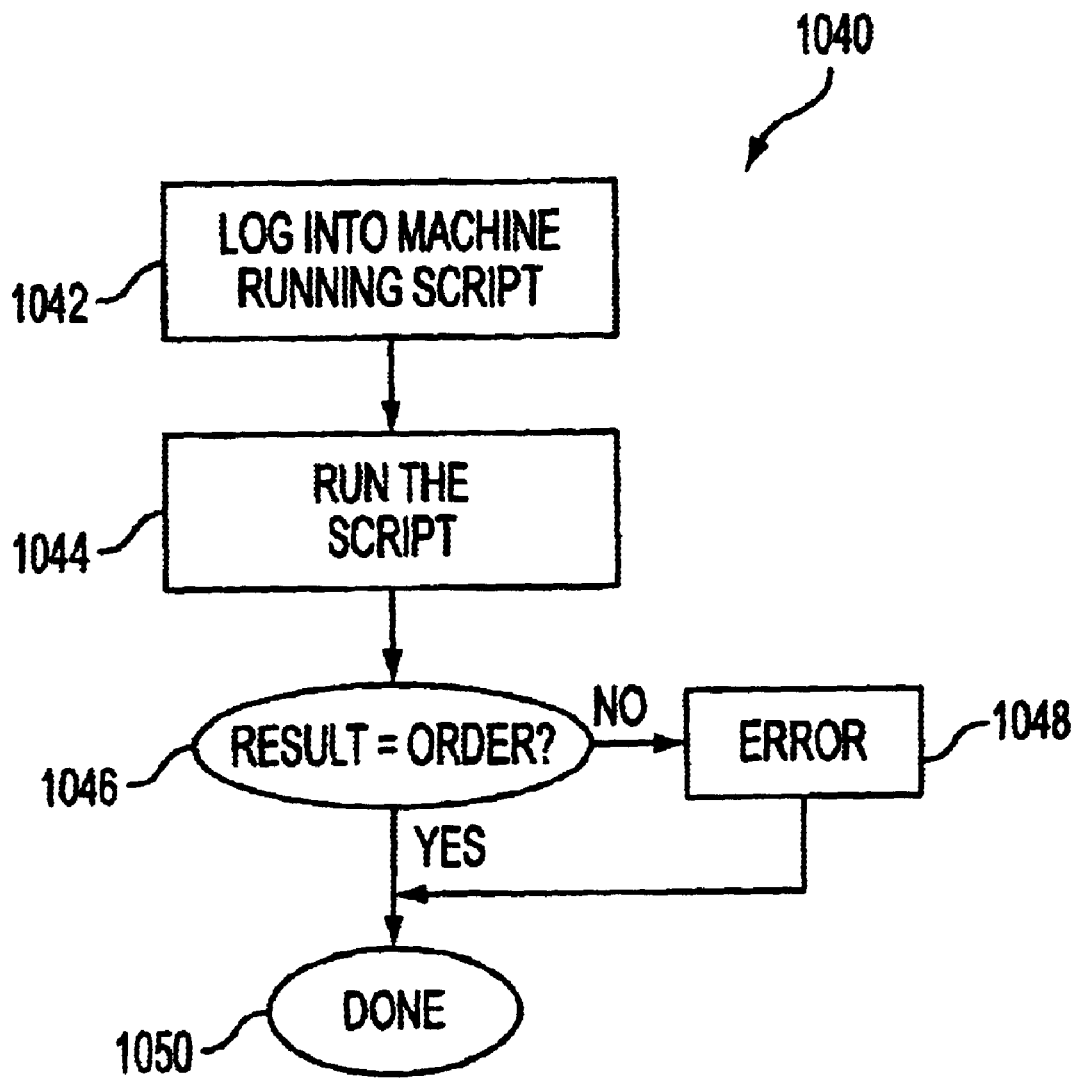
FIG. 17C is a flowchart showing a script checking process, in accordance with another aspect of the present invention.

FIGS. 17A–17C are flowcharts showing various methods for checking the results of various monitors included in a composite monitor to determine if an error should be raised. FIG. 17A is a flowchart showing an email confirmation process 1000, in accordance with an embodiment of the present invention. In an initial operation 1002, a user logs into an email server. Generally, this is accomplished via login name and a password. Typically, a network administrator supplies these elements. However, individual users may occasionally be granted permission to generate their own login names and passwords.

Next, in a receive operation 1004, email messages are received. Preferably, this is done one individual message at a time. As each message is received various tests are performed on the message, as described subsequently.

A decision is then made as to whether the message is NULL, in operation 1006. If so, there has been error. See operation 1008. In this case, all the available email messages were examined, and a match was not found. If the message is not NULL the process 1000 continues with a matching operation 1010.

In matching operation 1010, the message is tested for its content. If the message matches the order that has been placed by the user, the process 1000 is complete, in operation 1012. However, if there is not a match, the process 1000 continues with another receive operation 1004.

FIG. 17B is flowchart showing a database confirmation process 1020, in accordance with one aspect of the present invention. In a login operation 1022, the user logs into the database. As with an email server, this is generally accomplished via login name and a password. Typically, a network administrator supplies these elements. However, individual users may occasionally be granted permission to generate their own login names and passwords.

Next, in a query operation 1024, a query is performed on the database. Essentially, the database is queried for the order that was placed. A determination is then made concerning the result obtained by the query, in operation 1026. If the result of the query does not match the order placed or no result found in the database, then a confirmation of the order cannot be made and an error results. See operation 1028. However, if the result of the query matches the order placed, a confirmation is made and the process 1020 is completed in operation 1030.

FIG. 17C is a flowchart showing a script checking process 1040, in accordance with another aspect of the present invention. Initially, a login is performed to log into the machine executing the script, in operation, 1042.

The script is then executed, in operation 1044, and result is obtained. The result is then compared to the order placed, in operation 1046. If the result does not match the order that was placed, there can be no confirmation and an error is produced, in operation 1048. If the result of the script matches the order placed a confirmation is made and the process is completed, in operation 1050.

The present invention may be used to test websites in a flexible and thorough manner. The monitors of the present invention may test multiple features of web pages such as links, inputs, frames, and function buttons. These monitors may also test dynamic interactions with the web site such as product ordering, email confirmation, database confirmation, and file and account creation. Upon testing of such dynamic web site features, the present invention generates reports that aid in correction of any detected errors. Further, the monitor of the present invention is operable to achieve these goals while acting as a single portal to a user. Thus, while the present invention is capable of testing multiple web sites supported by multiple servers, it provides a simplified single interface to allow the user to conduct unique individualized or similar group tests of several web sites.

Unfortunately, the simple downloading of web pages with, perhaps, a cursory examination of the HTML is often insufficient to deter mine all the errors that a user might encounter when actually interacting with those web pages. This is due, in part, to the complex interactivity permitted under the HTML standards, and is due, in part, to the fact that many in tractions with web pages are "dynamic" in that they may change from session to session. It would therefore be desirable to have a method for testing a web site which can test multiple features of web pages, and which can handle dynamic interactions with the web site.

Figure 18:
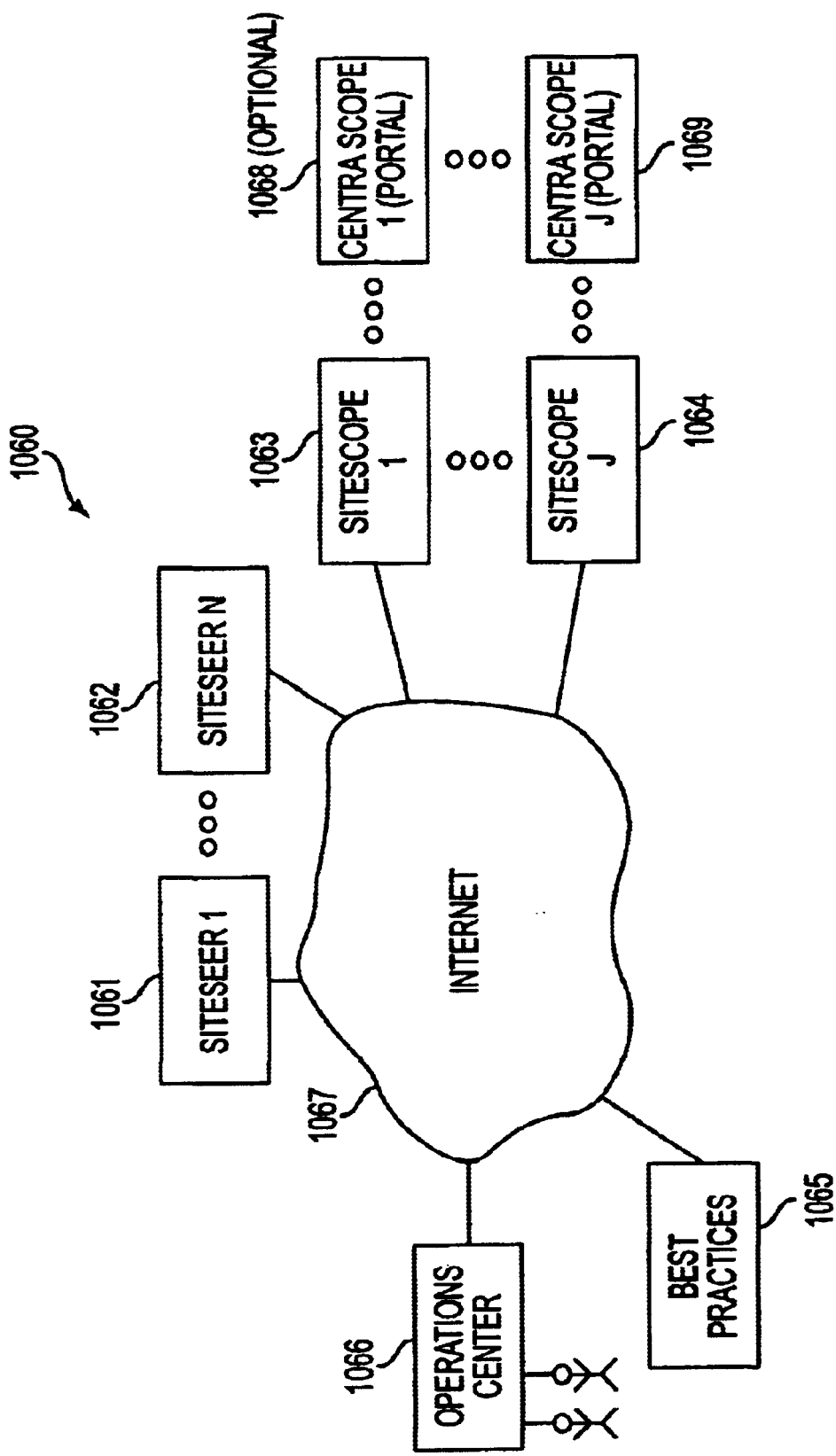
FIG. 18 is an illustration of a monitoring system, in accordance with an embodiment of the present invention.
Figure 19:
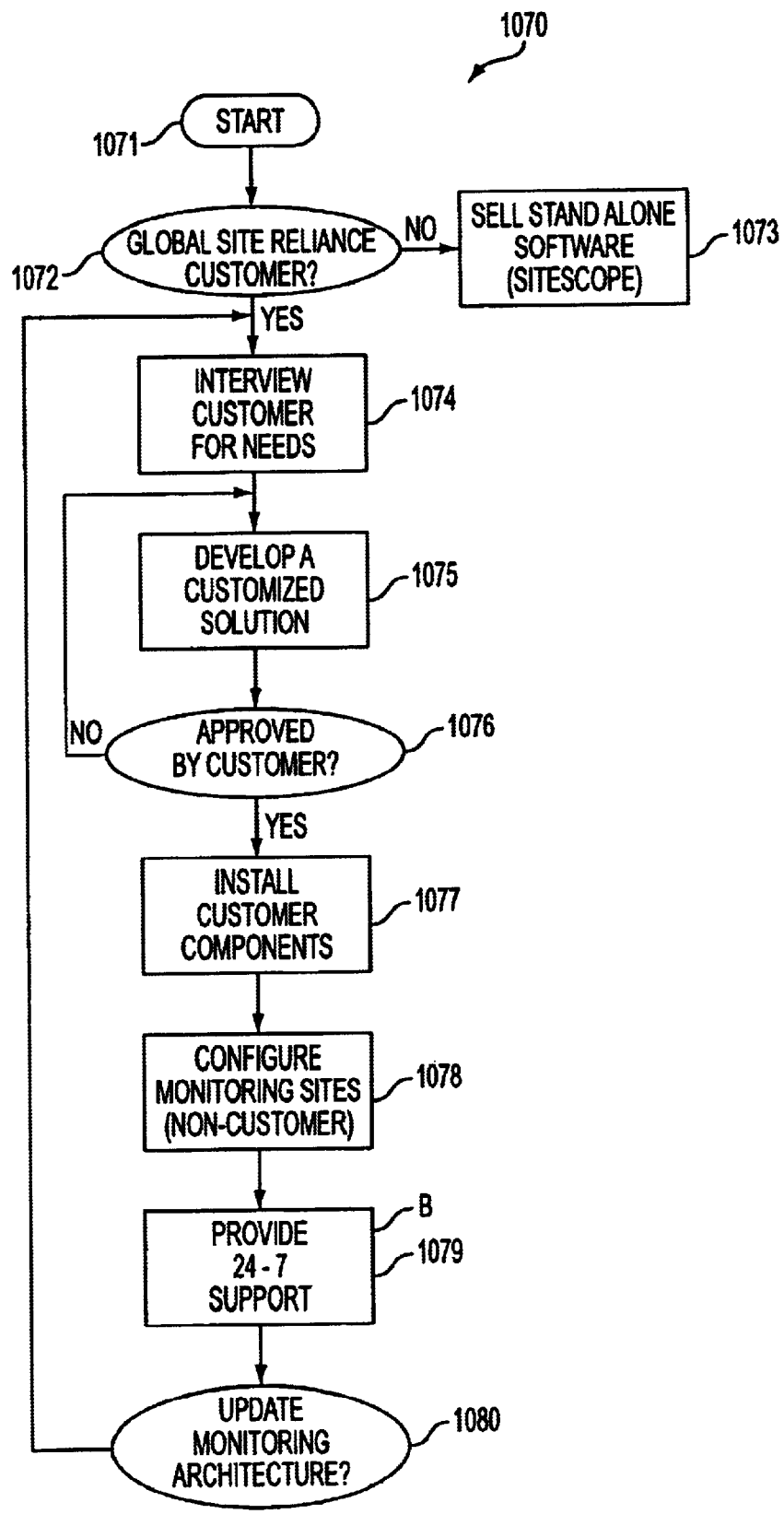
FIG. 19 is a flow-diagram showing a business method for providing a monitoring system, in accordance with one aspect of the present invention.
Figure 20:
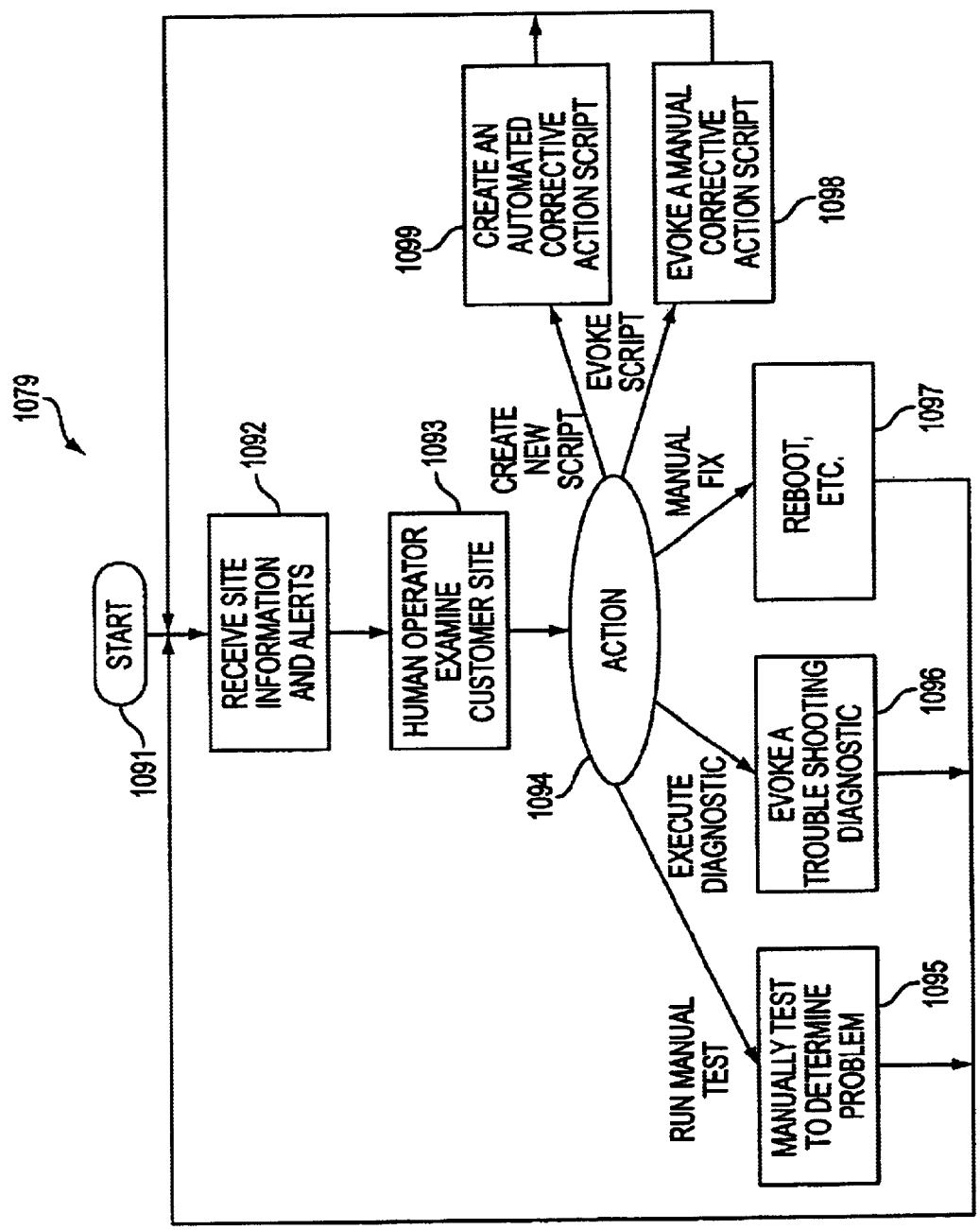
FIG. 20 is a flow-diagram illustrating the "PROVIDE 24-7 SUPPORT" operation of FIG. 19.

FIGS. 18–20 are illustrations showing different aspects of a business method, in accordance with an embodiment of the present invention. FIG. 18 monitoring system shows 1060 having a plurality of SiteSeer applications 1061–1062, a plurality of SiteScope applications 1063–1064, a Best Practice application 1065, and an operations center 1066, all coupled to the Internet 1067. Additionally, a plurality of CentraScope applications 1068–1069 may be used as a portal with the SiteScope applications 1063–1064.

The SiteSeer applications 1061–1062 are executed on test computers located at nodes placed around the world. This is desirable in order to test client's web based application from different network paths, thereby more realistically simulating a user accessing a client's site from a different country. The SiteScope applications 1063–1064 are configured to run at a client's location. SiteScope operates on a client's centralized or distributed system. CentraScope 1068–1069 is an optional portal that may be used in conjunction with SiteScope to better manage and configure multiple servers. The Operations Center 1066 is staffed with people serving as monitor operators who work with and act upon alerts received from the monitoring applications. The Best Practices Library 1065 is a component of pre-existing assets modified for each client. It is implemented as a text-based list located on a website and is made accessible to a client. These elements of the present invention will be discussed in more detail below.

In one embodiment of the present invention, an important part of the business method is the relationship with the client. The client is provided assistance in creating an monitoring architecture that is expandable over time. For example, the client's system may start with only a few servers. Over time, the client may expand to have several servers as well as add services such as mirroring and caching. In one embodiment, the client is charged on a per monitor subscription basis. Thus, a client would subscribe to use monitors on a year by year basis. As a client expanded over the years, the client would subscribe to additional monitoring services to better meet their needs. Factors affecting the monitors a client requires include the number of sites a client has, the number of back-ups for their servers a client requires, the complexity and number of transactions involved in the clients services, and the number and degree of monitoring a client desires to implement.

FIG. 19 is a flow diagram illustrating a business method for providing a client with a monitoring system, in accordance with an embodiment of the present invention. The process begins with a start operation 1071. In operation 1072, it is determined whether or not the client is or would like to become a Global SiteReliance Customer. If the client is not a Global SiteReliance Customer, than the client may purchase stand-alone software. The stand-alone software may include SiteScope or SiteSeer. After purchasing the stand-alone software, the client generally has no regularly scheduled contact with the software provider on a long term basis. However, the software provider may inquire about the stand-alone software's operability and other issues after the initial purchase.

If the client is a Global SiteReliance Customer, the client's particular monitoring needs are determined in an "interview customer for needs" operation 1074. Upon determining a customer's needs, a customized monitoring system is developed for the client in an "develop a customized solution" operation 1075. The customized monitoring system is developed by configuring the elements illustrated in FIG. 9 to meet the clients needs. This is described in more detail below. In one embodiment, the system may be implemented as a virtual private network between the system provider and the client. This provides the client with added security throughout the monitoring process. Once a customized monitoring system is developed, the system is presented to the client in an "approved by customer" operation 1076. If the monitoring system is not approved by the client, the system is modified to better meet the requirements of the client in an "develop a customized solution" operation 1075. If the customized monitoring system is approved by the client, the system is then implemented.

The first step of the implementation is to install the customer components in an operation 1077. This usually involves the software provider sending qualified personnel to the location or locations of the client to install the software and any required hardware. The software may also be downloaded through a network such as the Internet. Next, remote monitoring sites are configured according to the customized monitoring system in a "configure monitoring sites (non-customer)" operation 1078. This usually involves configuring remote sites all over the world through the Internet or some other network. Once the installation is complete, the client receives customer support from the software provider in an "provide 24-7 support" operation 1079. In a preferred embodiment, customer support is provided to the client 24 hours day and seven days a week. The customer support involves addressing customer questions and concerns regarding operation and reliability of their server, and the functionality of the installed monitoring system. Next, the customized monitoring system may be changed in an "update monitoring architecture" operation 1080. A change in the system may be initiated by factors such as client growth or a change in applications the client is hosting. Either the client or the software provider may initiate an update to the system, as is discussed below.

With reference to FIG. 18, the "developing a customized solution" operation 1075 of FIG. 19 is now described in more detail. As discussed above, the components used to create a system within the Global SiteReliance concept are the SiteSeer, SiteScope, CentraScope, Best Practices Library, and Operations Center, as pictured in FIG. 18. A client may wish to use these components of the monitoring system based upon their client base, the size of the client, and other factors. These components are now addressed individually.

The SiteScope application is used to set up monitoring inside a data center of the client. The monitor provider extracts information from monitors placed within the clients data centers through the Internet. Through SightScope, the software provider provides for the gathering of telemetry data from inside the client's data center at various points. In one embodiment, the telemetry data is gathered from inside the client's data centers at the most vulnerable telemetry point and other key positions that may indicate where a failure may occur. Thus, SiteScope feeds the client and the software provider real time performance data about their application and their servers. All clients are provided with a SiteScope application to monitor their system from an internal point of view.

CentraScope is one embodiment of the portal that gives the client and the software provider a framework for managing large amounts of performance data. As discussed above, the enterprise portal is operable to collect and aggregate data and present it in an organized manner. The presentation may include reports of reliability and other issues related to a monitoring system. It also is able to configure or 'push data' to a large number of SightScope applications or web servers that CentraScope may interact with. Clients having a large number of servers that require monitoring or configuration would likely implement CentrScope. However, CentraScope is merely an optional component of the monitoring system.

SiteSeer is an application used for instrumenting the monitoring from locations around the world. In one embodiment, the monitoring is done from popular business centers around the world in countries such as England, France, Germany, Australia, United States, Japan, Canada, and other countries that a client may expect their respective clients to access their web services from. SiteSeer may perform numerous transactions with a clients website, monitor and record the results for the transactions, record the performance data, and then process the resulting information. One advantage of this system is that monitoring from different countries will render different results and response times. This enables a client to determine weaknesses in their systems as viewed from different locations around the world. SiteSeer may also set alerts for web site response time and other elements of the client's web site networking. For example, a client may want to be alerted if a response time for their web site exceeds seven seconds. If an alert is received, SiteScope and the software companies supporting staff may determine the cause of the alert from the SiteScope reports of the monitoring. The reports may indicate that the client hardware or software needs to be updated. In some instances, a client may solve an alert regarding a slow response time in another country by caching information at different locations. The reports may also indicate that a networking path or a service provider is down, thereby informing a client of the reliability of their service provider and of a possible need to consider back-up systems or a change in their provider. Further, the monitor systems implemented on SiteScope at the client location may be the same monitors implemented on the SiteSeer remote nodes. This allows for a client to compare monitoring issues from internal and external points of view, thus suggesting a firewall problem or problem somewhere else within the perimeter of the system. Clients that provide web resources and services to their respective clients in different locations and countries would likely implement the SiteScope application within their monitoring system.

The Best Practices Library is a text-based guide that addresses common failure or stress points for different web based systems. In one embodiment, the library is available to the client through a web site that the client may access over the Internet. The library is a broad document that is then customized for each client depending upon their specific web-based applications and services. Different clients have different needs for their respective clients. For example, some clients such as internet service providers provide web access according to a service level agreement while other clients simply represent to their respective clients that their web site is available to at all times. As the clients monitoring system is configured and developed, their respective library is updated to better address the clients needs regarding their system. This involves eliminating information not relevant to the particular client as well as making general information more specific to the client's needs. A portion of the Best Practices application is applicable to several types of services, such as monitoring routers and queues, monitor the bottlenecks and keep information moving forward, queues that monitor outgoing information against incoming information such as sending confirmation information, and other recognizable problem spots. All clients are provided with a Best Practices Library which is updated as the clients monitoring system is developed and enhanced.

The Operations Center is a facility staffed with monitor operators. The monitor operators utilize all the components discussed above as tools to instrument the customers applications as soon as possible for early warning signals that a problem will occur or a real time alert that a problem has just occurred. In the case of an alert, an operator at the operations center is notified by pager, email, or some other electronic method of the alert. As discussed more fully below, the monitor operator then assess the alert and modifies the client's initial system configuration by enhancing the system to better prevent or deal with any common alerts the system may be experiencing. For example, the monitor operator may observe an alert that halts a customers system three times within a short period of time. After notification of the alert, an operator may then remotely re-start the system, log the problem to notify the client, and configure a script to deal with the alert. In particular, when SiteScope detects the occurrence of an alert indicating the client's system has halted, the system will automatically execute a script which may restart the system automatically. All clients are provided with Operation Center support with their monitoring systems The "provide 24-7 support" operation 1079 of FIG. 19 shall now be described in more detail. As shown in FIG. 20, the process begins with a start operation 1091. Next, the monitor operators will receive an alert from a customer's system in a "receive site information and alerts" operation 1092. As discussed above, the alert may be received by a monitor operator in the form of a page, an email, a display on a screen, or any other electronic means. Upon receiving the information and alert, a person serving as an operations monitor will examine the customer site in a "human operator examines customer site" operation 1093.

After examining the client's site, the monitor operator may then take some action to address the alert in an "action" operation 1094. One possible action may be to manually test the server to determine the problem as in operation 1095. The manual test may include testing suspect areas of the clients server. The suspect portions are determined from the alert generated and the experience of the monitor operator. Such manual testing will generate more site information and alerts that can be used to further identify and eliminate any problem with the client's server. Another possible action is to evoke a trouble shooting diagnostic as in operation 1096. The predetermined diagnostic is a trouble shooting diagnostic that goes through a testing sequence in order to isolate the problem with the clients web page or server. The monitor operator may also manually fix any cause of the alert in an operation 1097. This may involve manually rebooting the client's system or performing some other task from the operations center. Another possible action is manually evoking a corrective action script in operation 1098. Alternatively, the monitor operator may create an automated corrective action script in an operation 1099. In some situations, creating a script may better address a customer's specific alert. Preferably, all the corrective actions are accompanied by logging the alert and corrective action into a log. This helps the client and monitor operators to identify repetitive alerts that indicate a suspect portion in their server.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A system for testing web sites, the system comprising:
   a plurality of servers wherein each server of said plurality of servers is operable to support at least one web site;
   a plurality of test computers, wherein:
      each test computer of said plurality of test computers includes a processor and a memory and is coupled to a database; and
      each test computer of said plurality of test computers is coupled to at least one server of said plurality of servers; and
   a portal that is coupled to said plurality of test computers, wherein said portal being operable to transmit and receive information from said plurality of test computers.

2. The system as recited in claim 1, wherein said portal is has an interface that is operable to allow a user to receive and to input data.

3. The system as recited in claim 2, wherein said interface is associated with a display that is tailored for said user according to one or more criterion from a set of criteria.

4. The system as recited in claim 3, wherein said set of criteria comprises:
   a security classification associated with said user;
   a group identification associated with said user;
   one or more display preferences selected by said user; and
   one or more display settings associated with a task selected by said user.

5. The system as recited in claim 2, wherein said interface is a browser.

6. The system as recited in claim 1, is an enterprise portal system and wherein said plurality of test computers and said plurality of servers are part of a distributed computing system.

7. The system as recited in claim 1, wherein:
   each test computer of said plurality of test computers is coupled to at least one server of said plurality of servers; and
   each test computer of said plurality of test computers is operable to transmit and receive information from said at least one server.

8. The system as recited in claim 1, wherein:
   said portal is coupled to said plurality of test computers; and
   said portal is coupled to a portal database.

9. The system as recited in claim 1, wherein said information is test information associated with said web sites that are being tested.

10. The system as recited in claim 1, wherein said portal controls functionality of said plurality of servers by transmitting to said plurality of test computers configuration information that is associated with a monitoring mechanism, and wherein said plurality of test computers transmit said configuration information to said plurality of servers.

11. The system as recited in claim 1, wherein said plurality of test computers are capable of direct HTTP and HTML communication with said plurality of servers.

12. The system as recited in claim 1, wherein each test computer of said plurality of test computers is operable to:
   send formatted information to a web browser, wherein said formatted information comprises a testing form;
   receive a formatted message as a first submission in response to sending said formatted information, wherein first submission is from said testing form; and
   develop a test configuration file from said formatted message;
   populate said testing form based on said test configuration file to create a populated testing form;
   send a second formatted information comprising said populated testing form to said web browser;

receive a second formatted message from said web browser as a second submission in response to sending said second formatted information, wherein second submission is from said populated testing form; and update said test configuration file based on said second formatted message, wherein the step of updating comprises adding one or more features to said test configuration file, and wherein said one or more features are user specific.

13. A method for providing an enterprise portal system for testing web sites, the method comprising the computer-implemented steps of:

providing a plurality of servers wherein each server of said plurality of servers is operable to support at least one web site;

providing a plurality of test computers, wherein:
each test computer of said plurality of test computers includes a processor and a memory and is coupled to a database; and
each test computer of said plurality of test computers is coupled to at least one server of said plurality of servers; and providing a portal that is coupled to said plurality of test computers, wherein said portal being operable to transmit and receive information from said plurality of test computers.

14. The method as recited in claim 13, wherein said portal is has an interface that is operable to allow a user to receive and to input data.

15. The method as recited in claim 14, further comprising the step of tailoring a display for said user according to one or more criterion from a set of criteria, wherein said display is associated with said interface.

16. The method as recited in claim 15, wherein said set of criteria comprises:
a security classification associated with said user;
a group identification associated with said user;
one or more display preferences selected by said user; and
one or more display settings associated with a task selected by said user.

17. The method as recited in claim 15, wherein said user controls the step of tailoring by selecting from said set of criteria.

18. The method as recited in claim 14, wherein said interface is a browser.

19. The method as recited in claim 13, wherein said information is test information associated with said web sites that are being tested.

20. The method as recited in claim 19, wherein said test information relates to functionality of said web sites.

21. The method as recited in claim 13, wherein said plurality of test computers and said plurality of servers are part of a distributed computing system.

22. The method as recited in claim 13, wherein:
each test computer of said plurality of test computers is coupled to at least one server of said plurality of servers; and
each test computer of said plurality of test computers is operable to transmit and receive information from said at least one server.

23. The method as recited in claim 13, wherein:
said portal is coupled to said plurality of test computers; and
said portal is coupled to a portal database.

24. The method as recited in claim 13, wherein said portal controls functionality of said plurality of servers by transmitting to said plurality of test computers configuration information that is associated with a monitoring mechanism, and wherein said plurality of test computers transmit said configuration information to said plurality of servers.

25. The method as recited in claim 13, wherein said portal controls is further operable to provide to a user a report of functionality of one or more servers of said plurality of servers over a period of time.

26. The method as recited in claim 13, wherein said portal is further operable to provide to a user a status of one or more servers of said plurality of servers over a period of time.

27. The method as recited in claim 13, wherein said plurality of test computers are capable of direct HTTP and HTML communication with said plurality of servers.

28. The method as recited in claim 13, further comprising the steps of:
sending formatted information to a web browser, wherein said formatted information comprises a testing form;
in response to sending said formatted information, receiving a formatted message as a first submission, wherein first submission is from said testing form; and
developing a test configuration file from said formatted message;
populating said testing form based on said test configuration file to create a populated testing form;
sending a second formatted information comprising said populated testing form to said web browser;
in response to sending said second formatted information, receiving a second formatted message from said web browser as a second submission, wherein second submission is from said populated testing form; and
updating said test configuration file based on said second formatted message, wherein the step of updating comprises adding one or more features to said test configuration file, and wherein said one or more features are user specific.

29. An enterprise portal system for allowing a user to test one or more web sites within a distributed computing system comprising:

a plurality of test computers, wherein each test computer of said plurality of test computers includes a processor and a memory and is coupled to a database;

a plurality of servers wherein each server of said plurality of servers is operable to support at least one web site;

a portal that is:
coupled to said plurality of test computers;
coupled to a portal database; and
wherein:
each test computer of said plurality of test computers is:
coupled to at least one server of said plurality of servers; and
operable to transmit and receive information from said at least one server;
said portal being operable to transmit and receive information from said plurality of test computers;
said portal having an interface that is operable to allow the user to receive and to input data;
said portal controlling functionality of said plurality of servers by transmitting to said plurality of test computers configuration information that is associated with a monitoring mechanism, and wherein said plurality of test computers transmit said configuration information to said plurality of servers; and
said interface that is tailored for said user according to one or more criterion from a set of criteria, wherein said set of criteria comprising:

a security classification associated with said user;
a group identification associated with said user;
one or more display preferences selected by said user; and
one or more display settings associated with a task selected by said user.

* * * * *